(12) United States Patent
Dwyer et al.

(10) Patent No.: US 7,434,028 B2
(45) Date of Patent: Oct. 7, 2008

(54) HARDWARE STACK HAVING ENTRIES WITH A DATA PORTION AND ASSOCIATED COUNTER

(75) Inventors: Michael K. Dwyer, El Dorado Hills, CA (US); Hong Jiang, San Jose, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 11/012,688

(22) Filed: Dec. 15, 2004

(65) Prior Publication Data

US 2006/0155924 A1 Jul. 13, 2006

(51) Int. Cl.
*G06F 9/40* (2006.01)
(52) U.S. Cl. .................................................. 712/200
(58) Field of Classification Search .................. 712/200
See application file for complete search history.

(56) References Cited

U.S. PATENT DOCUMENTS

| | | | | |
|---|---|---|---|---|
| 4,677,546 A | * | 6/1987 | Freeman et al. ............. 711/203 |
| 4,988,998 A | * | 1/1991 | O'Brien ....................... 341/55 |
| 5,862,376 A | | 1/1999 | Steele, Jr. et al. |
| 5,903,769 A | * | 5/1999 | Arya .............................. 712/5 |
| 5,916,305 A | * | 6/1999 | Sikdar et al. ................ 709/236 |
| 6,028,962 A | * | 2/2000 | Claassen et al. ............. 382/239 |
| 6,079,008 A | | 6/2000 | Clery, III |
| 6,112,288 A | * | 8/2000 | Ullner ......................... 712/20 |
| 6,128,654 A | | 10/2000 | Runaldue et al. |

FOREIGN PATENT DOCUMENTS

GB 2 178 573 A 2/1987

OTHER PUBLICATIONS

"PCT International Search Report of the International Searching Authority", mailed Jul. 6, 2006, for PCT/US2005/045887, 4 pgs.

* cited by examiner

*Primary Examiner*—Eddie P Chan
*Assistant Examiner*—John Lindlof
(74) *Attorney, Agent, or Firm*—Buckley, Maschoff & Talwalker LLC

(57) ABSTRACT

According to some embodiments, determining a new value to be pushed onto a hardware stack having n entries is determined. Each entry in the stack may include a data portion and an associated counter. If the new value equals the data portion of the entry associated with a current top of stack pointer, the counter associated with that entry is incremented. If the new value does not equal the data portion associated with the current top of stack pointer, the new value is stored in the data portion of the next entry and the current top of stack pointer is advanced.

11 Claims, 25 Drawing Sheets

HARDWARE STACK HAVING ENTRIES WITH A DATA PORTION AND ASSOCIATED COUNTER

BACKGROUND

Information can be added to and retrieved from a storage area or data buffer referred to as a "stack," In the case of a Last In, First Out (LIFO) stack, values are retrieved ("popped") in an order based on when each value was added ("pushed") to the stack, with the most recently pushed value being the next value that will be popped. This type of stack can be thought of as a list of values in which newer values push down older values, and values are popped from the top of the list.

Such a stack could be implemented by storing each value in a Random Access Memory (RAM) unit and/or hardware registers. When a large number of values need to be stored in a stack, however, the amount of RAM and/or the number of hardware registers that would be required may be impractical.

BRIEF DESCRIPTION OF THE DRAWINGS

FIGS. 16 through 19 illustrate a SIMD execution engine executing nested loop instructions according to some embodiments.

DETAILED DESCRIPTION

Figure 1:
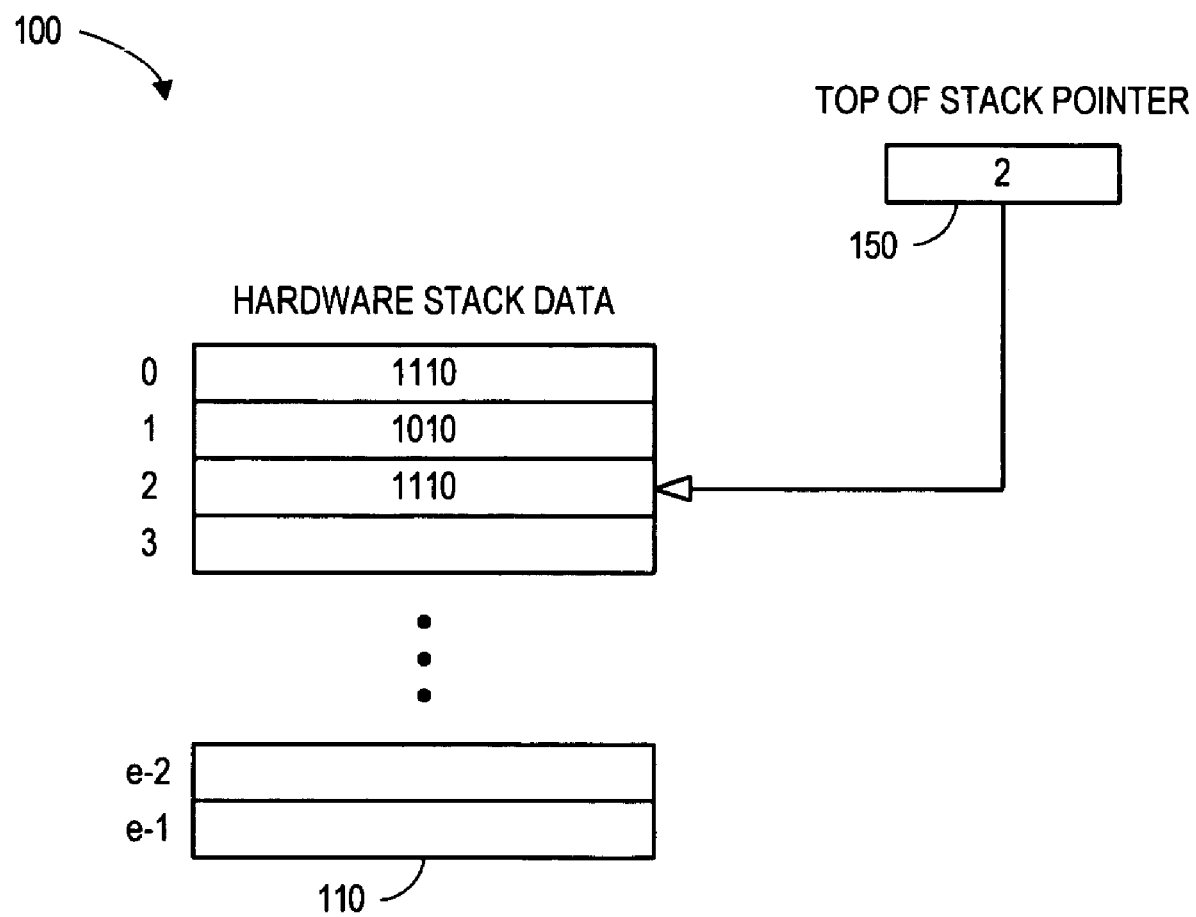
FIG. 1 is a block diagram of a hardware stack.

FIG. 1 is a block diagram of a hardware stack 100. In particular, the stack 100 includes a data storage area 110 able to support e data entries (e.g., up to e separate values can be stored in the stack 100 at one time). The stack 100 also includes a Top Of Stack (TOS) pointer 150 indicating the entry that is storing the most recent value pushed onto the stack.

In the stack 100 illustrated in FIG. 1, the TOS pointer 150 indicates that the value "1110" stored in entry 2 was the most recently added. If data were to be popped from the stack 100, the value "1110" would be output and the TOS pointer would be decremented to 1. If a new value were to be added to the stack 100 illustrated in FIG. 1, the new value would be stored in entry 3 and the TOS pointer 150 would be incremented to 3.

The data storage area 110 might be implemented, for example, using a RAM unit and/or hardware registers. When a large number of values need to be stored in the stack 100, however, the amount of RAM and/or the number of hardware registers that would be required may be impractical.

Figure 2:
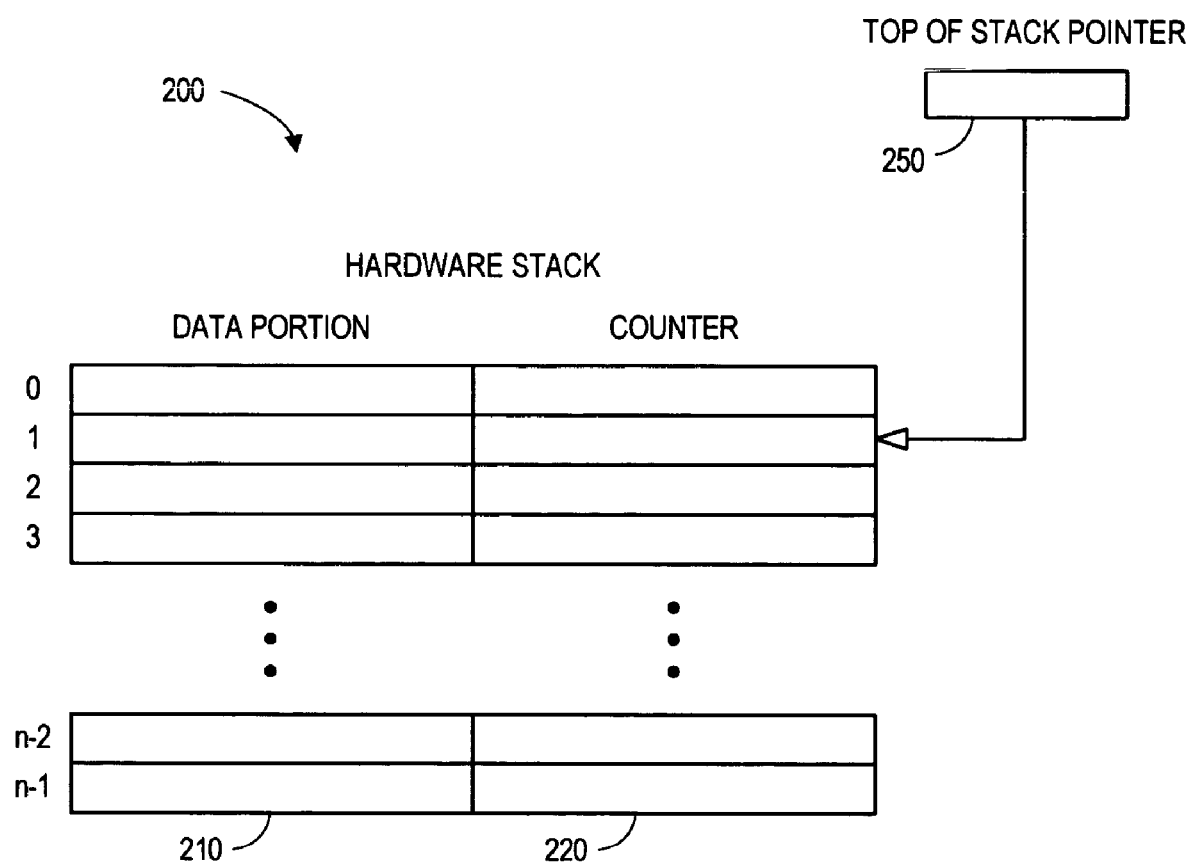
FIG. 2 is a block diagram of a hardware stack according to some embodiments.

FIG. 2 is a block diagram of a hardware stack 200 according to some embodiments. In this case, the stack 200 is a LIFO buffer with n entries (n being an integer greater than 1). Each entry in the stack 200 includes a data portion 210 and an associated counter 220. The counter 220 indicates how many times the value of the data portion 210 was repeatedly pushed onto the stack. The stack 200 also includes a TOS pointer 250. Any of the data portions 210, counters 220, and/or the TOS pointer 250 might be implemented, for example, in a RAM unit or with hardware registers. The operation of the stack 200 according to some embodiments will now be described with respect to FIGS. 3 through 10.

Figure 3:
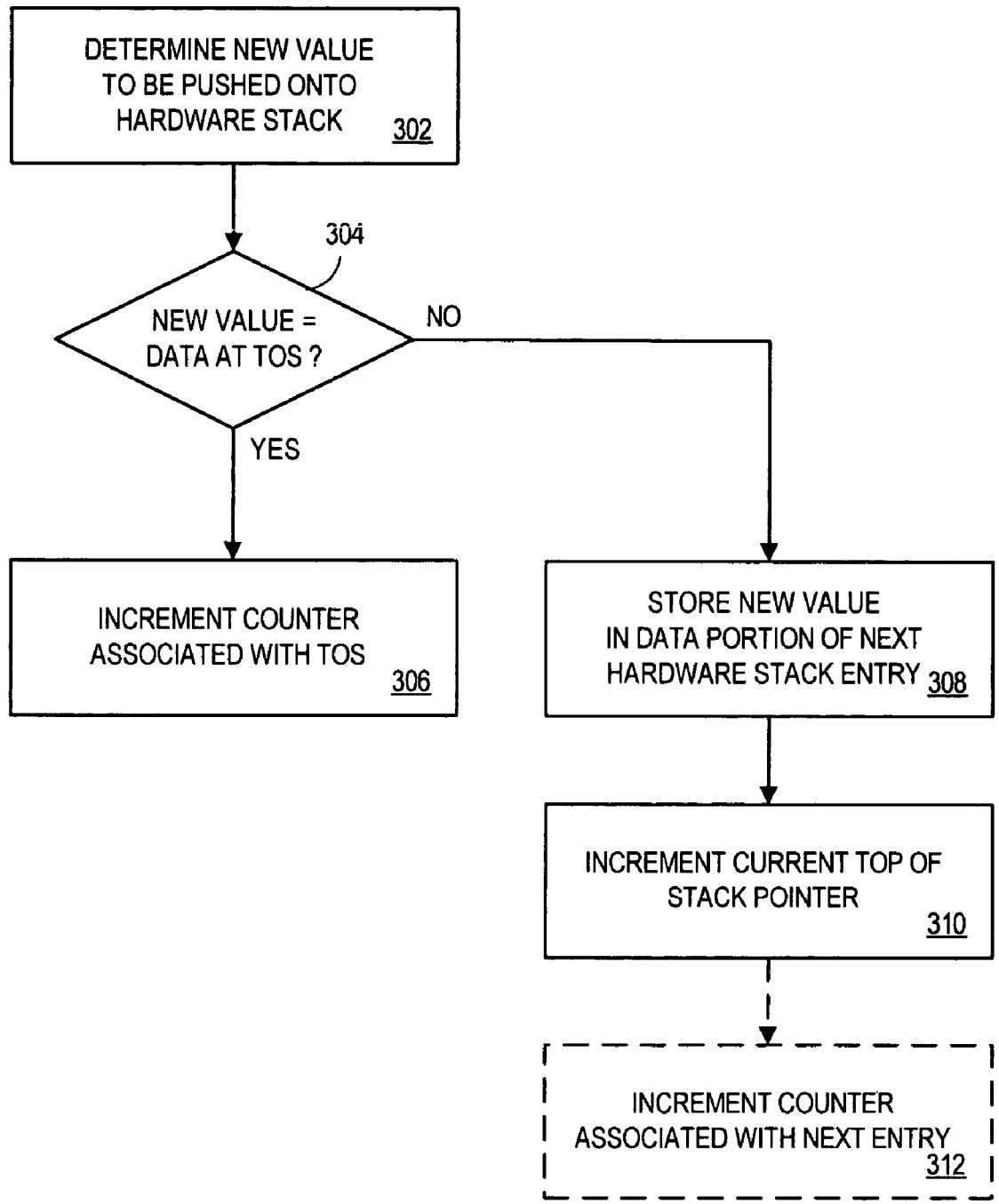
FIG. 3 is a flow chart of a method of pushing data onto a hardware stack according to some embodiments.

FIG. 3 is a flow chart of a method of pushing data onto a hardware stack according to some embodiments. The method of FIG. 3 might be used, for example, in connection with the stack 200 illustrated in FIG. 2. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, a new value to be pushed onto the stack 200 is determined. If the new value equals the value currently stored in the data portion 210 of the entry referenced by the TOS pointer 250, the counter 220 associated with that entry is incremented at 306.

If the new value being pushed onto the stack 200 does not equal the value currently stored in the data portion 210 of the entry referenced by the TOS pointer 250, the new value is stored in the next entry of the stack at 308. Moreover, the TOS pointer 250 is incremented at 310.

The counter 220 associated with the next entry might also be incremented at 312 (this assumes that all counters 220 were set to zero during an initialization process). As another approach, the counter 220 may simply be set to one at 312. This approach is included in some embodiments described herein solely for clarity of description. By incrementing the counter 220 at this point (or setting it to one), the number stored in the counter 220 will equal the number of times the associated value in the data portion 210 has been repeated. Without the action performed at 312 (and still assuming that all counters were set to zero during an initialization process), the number stored in the counter 220 would equal the number of times the associated value in the data portion 210 has been repeated minus one.

When the counter 220 indicates the number of times an associated value has been repeated, a stack 200 having with a first counter equal to zero means that the stack 200 is empty. When the counter 200 indicates the number of time an associated value has been repeated minus one, an empty stack might be signaled, for example, by an "empty stack" register bit. According to another embodiment, a "−1" might be stored in the first counter 220 to indicate that the stack is empty.

Figure 4:
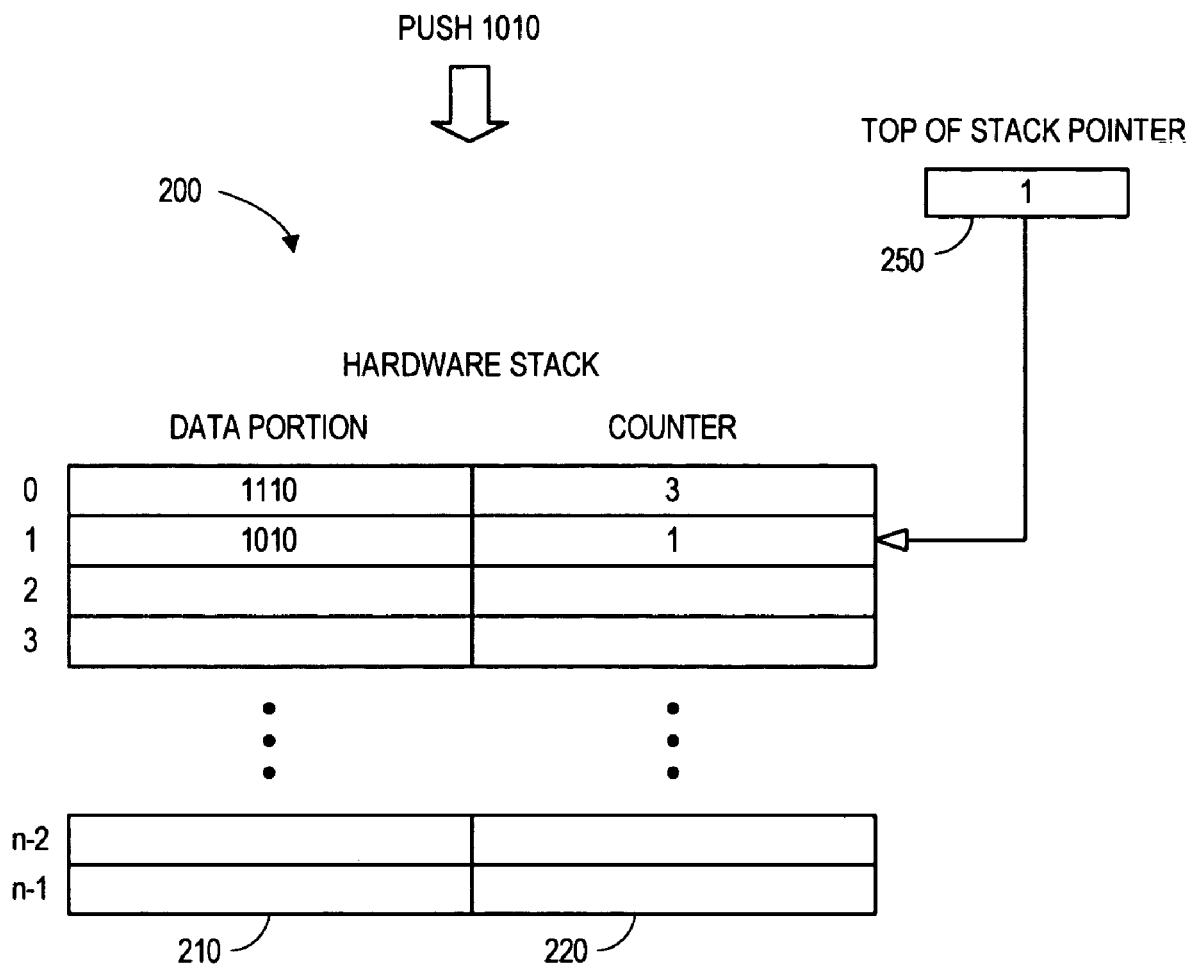
FIGS. 4 through 6 illustrate data being pushed onto a hardware stack according to some embodiments.
Figure 5:
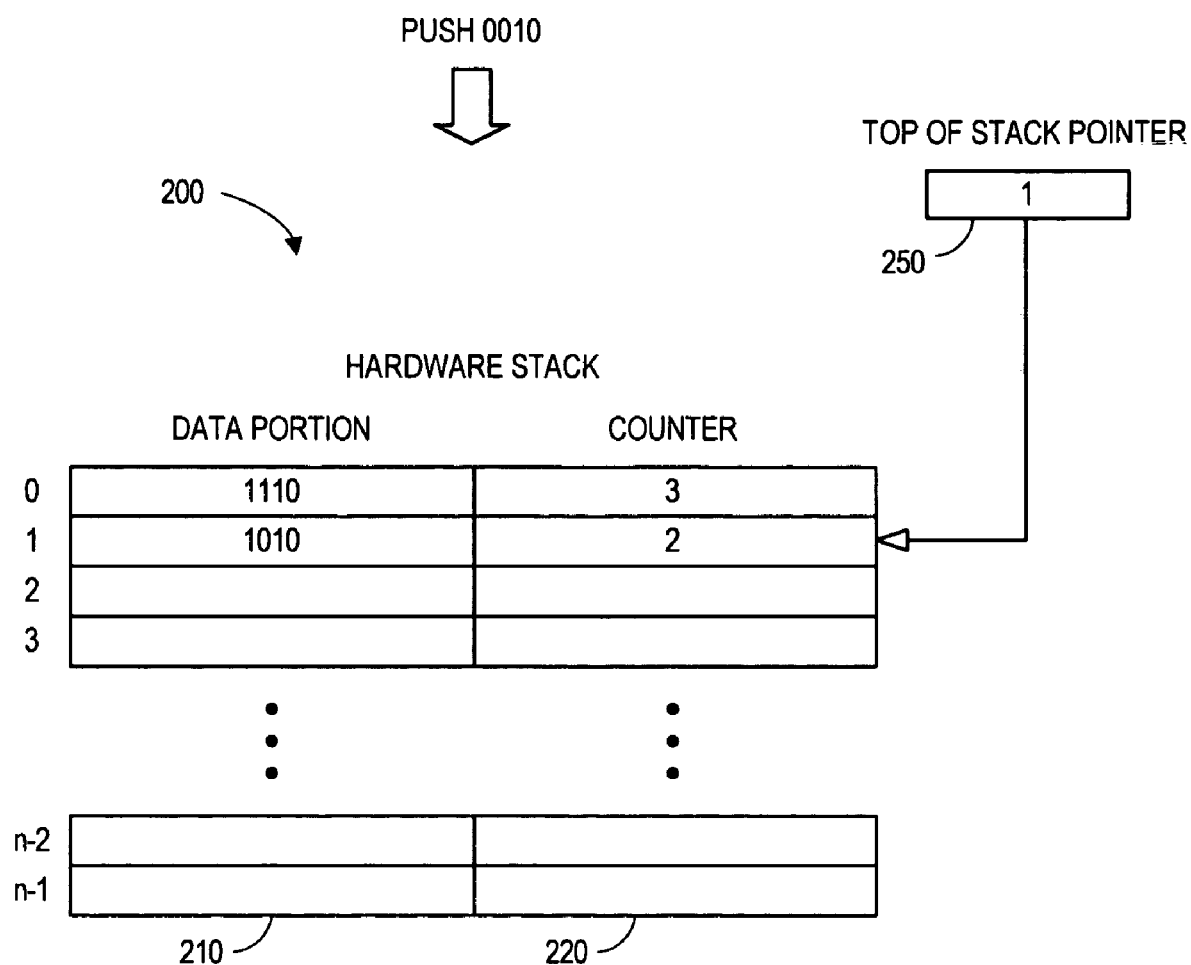

Refer now to FIG. 4, which illustrates the stack 200 having values in the first two entries. In particular, "1110" was pushed onto the stack 200 three times in a row (as indicated by the counter 220 of entry 0), and then "1010" was pushed onto the stack 200 once. Note that only two entries are used even though four pushes were made onto the stack 200 (e.g., "1110" three times and "1010" once). Moreover, a new value ("1010") is about to be pushed into the stack 200. Because this new value is equal to the value currently stored in the entry at the top of the stack (entry 1), the counter 220 associated with that entry is incremented from 1 to 2 as illustrated in FIG. 5. In this case, the new value is a "repeat" of the last value is pushed onto the stack 200.

Figure 6:
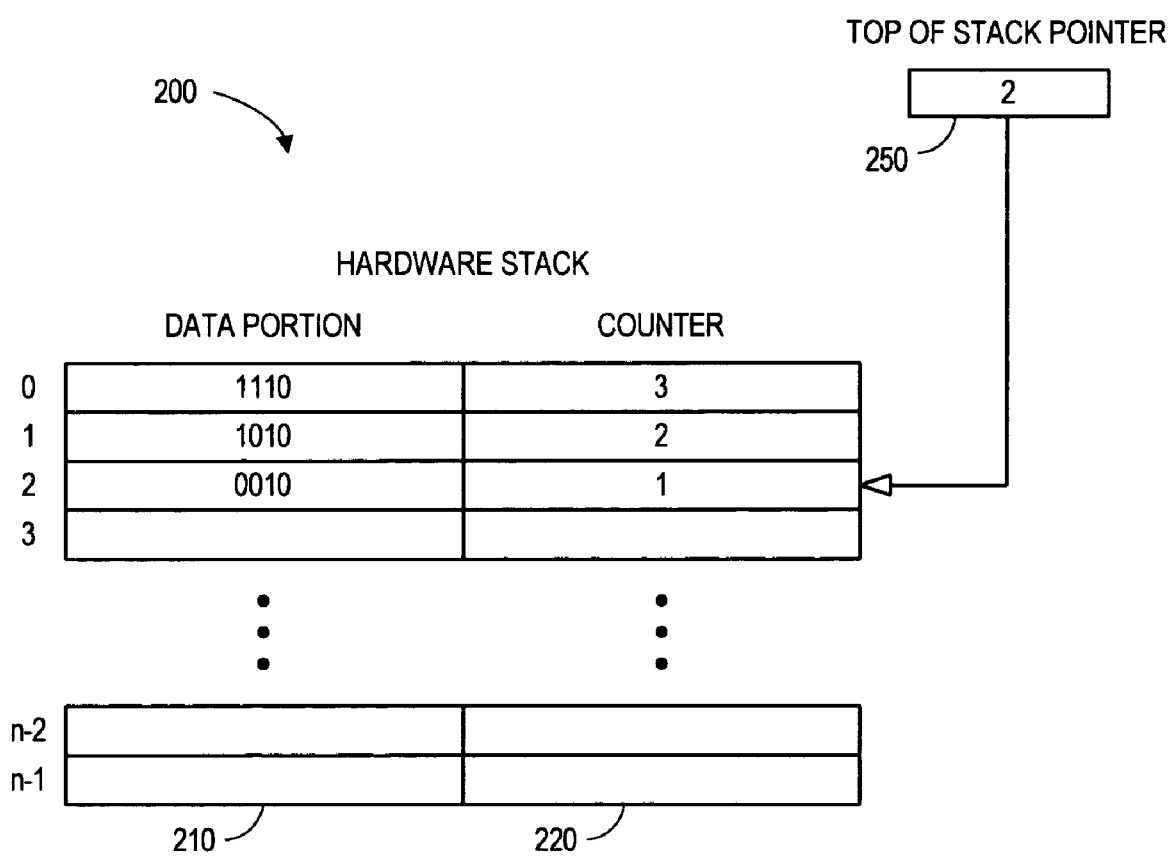

In FIG. 5, another new value ("0010") is about to be pushed into the stack 200. Because this new value is not equal to the value currently stored in the entry at the top of the stack (entry 1), the value is stored in the next entry (entry 2), the counter 220 associated with the next entry is incremented from 0 to 1, and the TOS pointer 250 is incremented from 1 to 2 as illustrated in FIG. 6.

Figure 7:
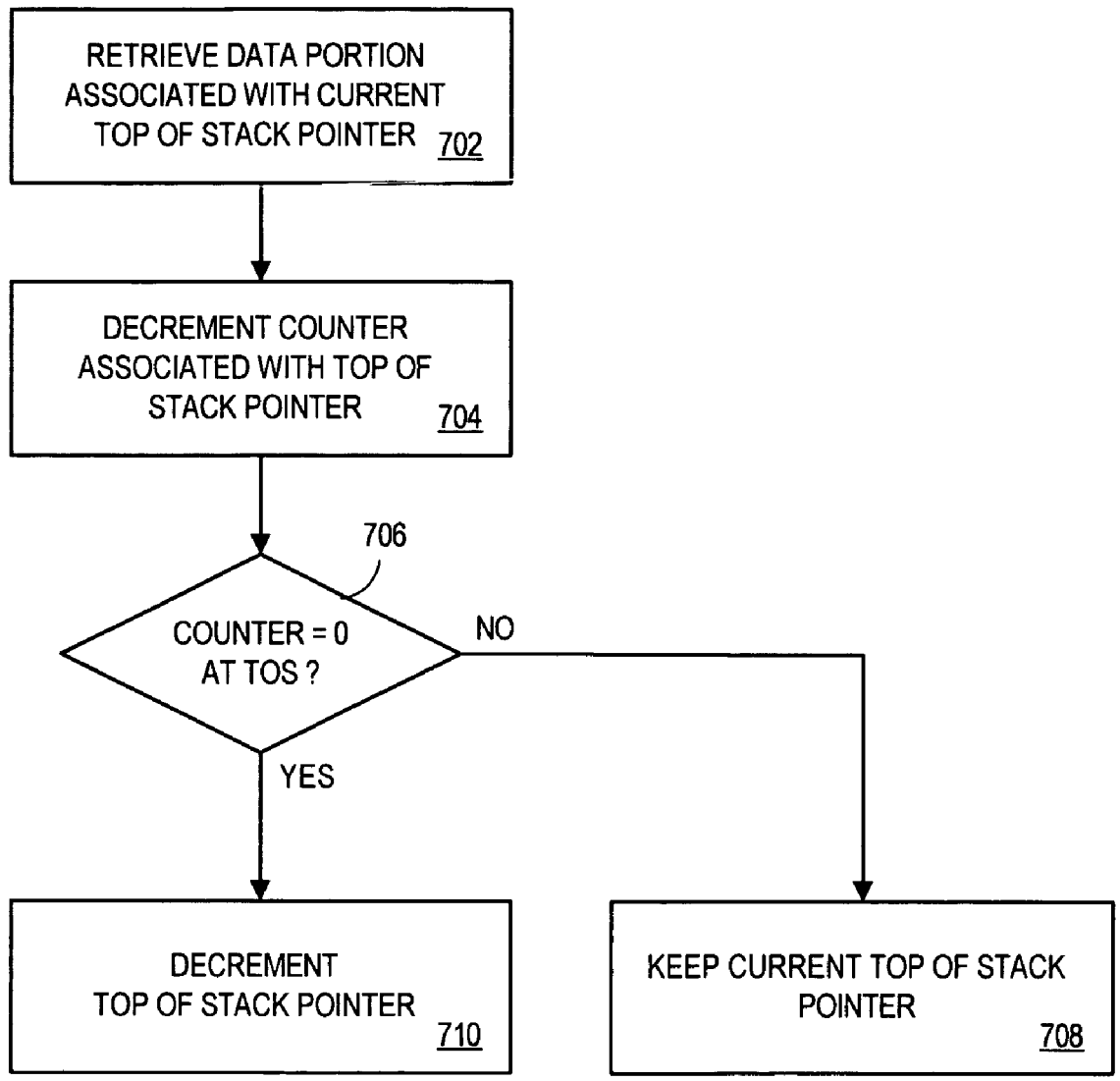
FIG. 7 is a flow chart of a method of popping data from a hardware stack according to some embodiments.

FIG. 7 is a flow chart of a method of popping data from the hardware stack 200 according to some embodiments. At 702, the value stored in the data portion 210 reference by the TOS pointer 250 is retrieved. The counter 220 associated with that entry is then decremented at 704. If that counter 210 does not equal zero at 706, the current value of the TOS pointer 250 is maintained at 708. If that counter 210 does equal zero, the TOS pointer 250 is decremented. This approach might be appropriate, for example, when the number stored in the counter 220 equals the number of times the associated value in the data portion 210 has been repeated. When the number stored in the counter 220 equal the numbers of times the associated value has been repeated minus one, the TOS pointer 250 might be decremented when decreasing the counter 220 causes an underflow.

Figure 8:
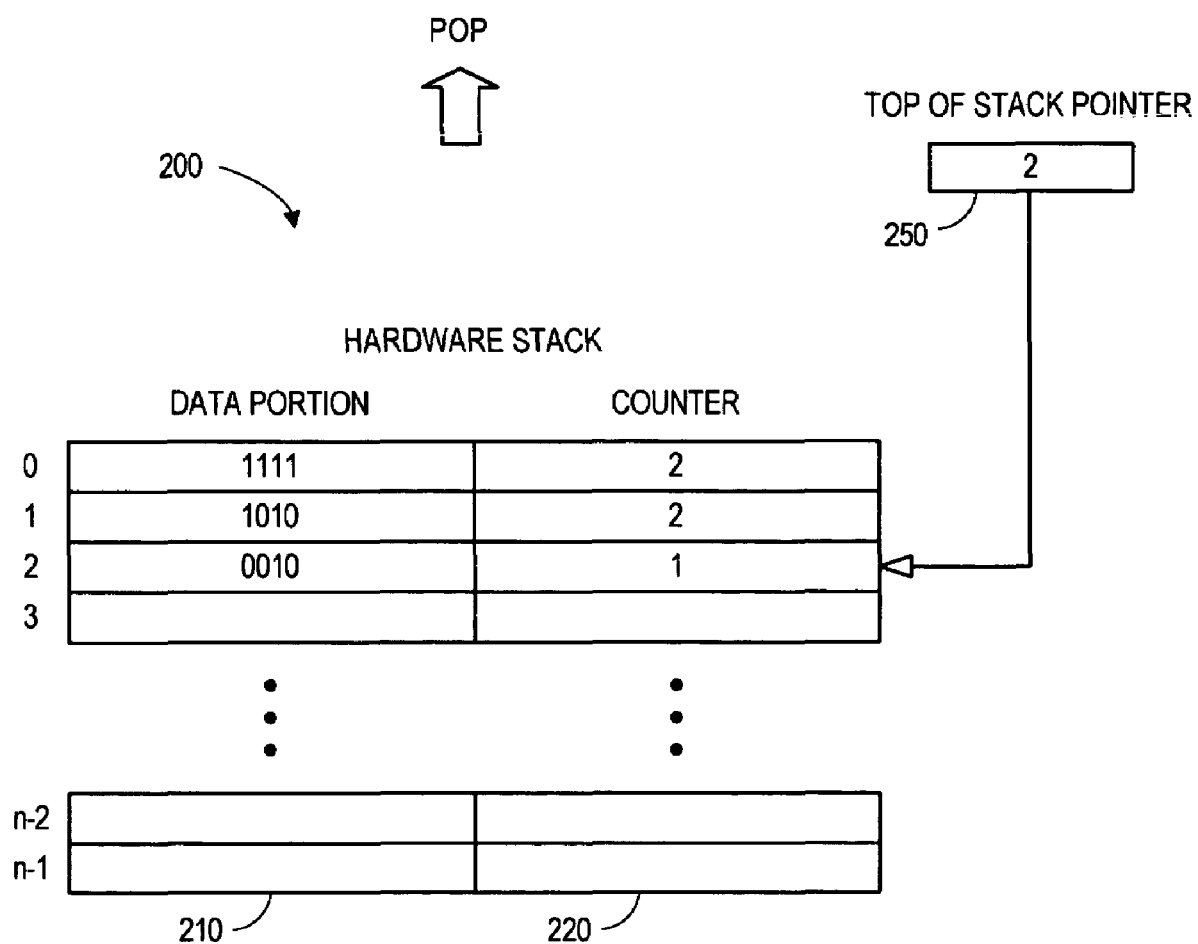
FIGS. 8 through 10 illustrate data being popped from a hardware stack according to some embodiments.

Refer for example, to FIG. 8, which illustrates the stack 200 currently storing values in the first three entries. In particular, "1111" was pushed onto the stack 200 twice in a row (as indicated by the counter 220 of entry 0), "1010" was pushed onto the stack 200 twice in a row, and then "0010" was pushed onto the stack 200 once. Moreover, a value is about to popped from the stack 200.

Figure 9:
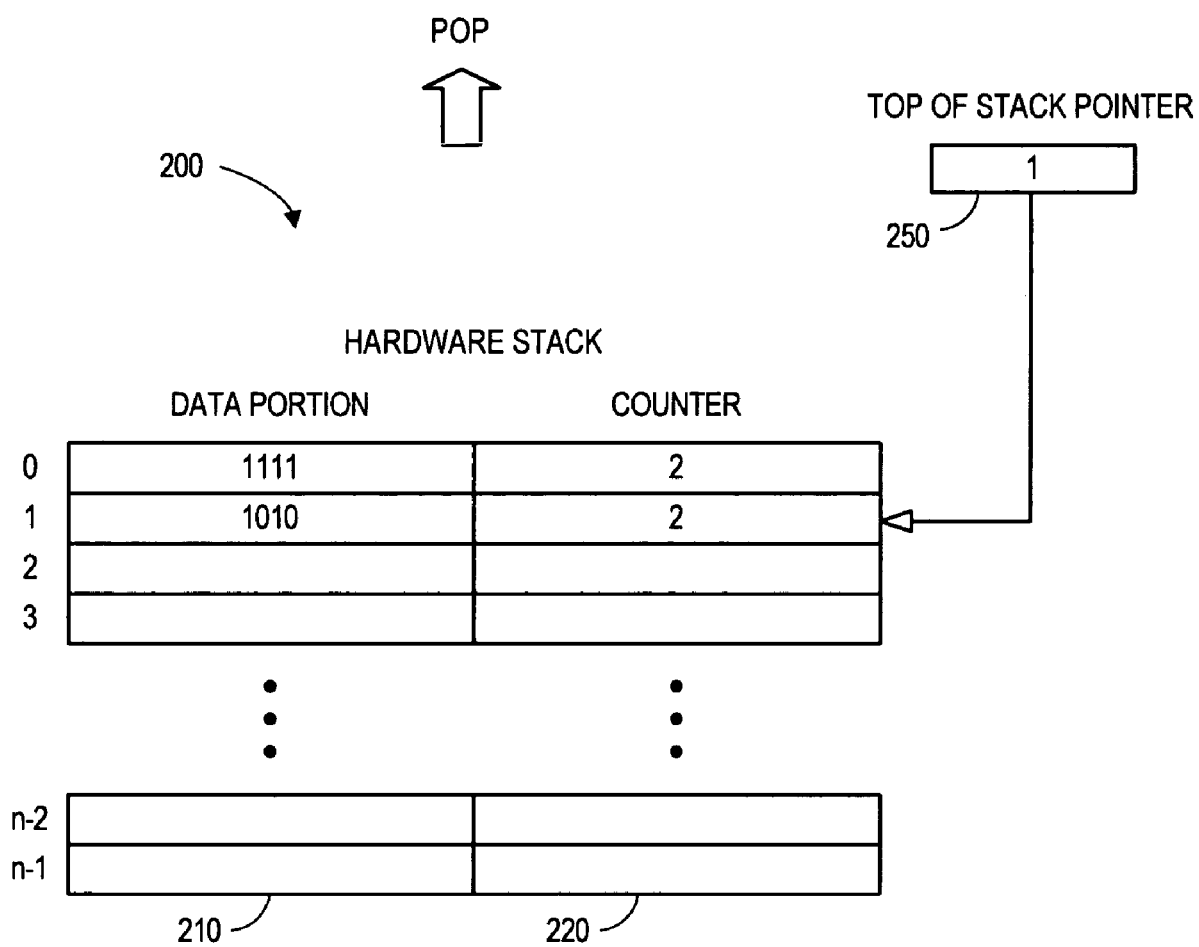

To perform the pop, the value stored in the data portion 210 of the entry referenced by the TOS pointer 250 is output ("0010"). Moreover, the counter 220 associated with that entry is decremented from 1 to 0. Because that counter 220 is now 0, the TOS pointer 250 is decremented from 2 to 1 as illustrated in FIG. 9. In this case, the entry associated with the pop has been "emptied."

Figure 10:
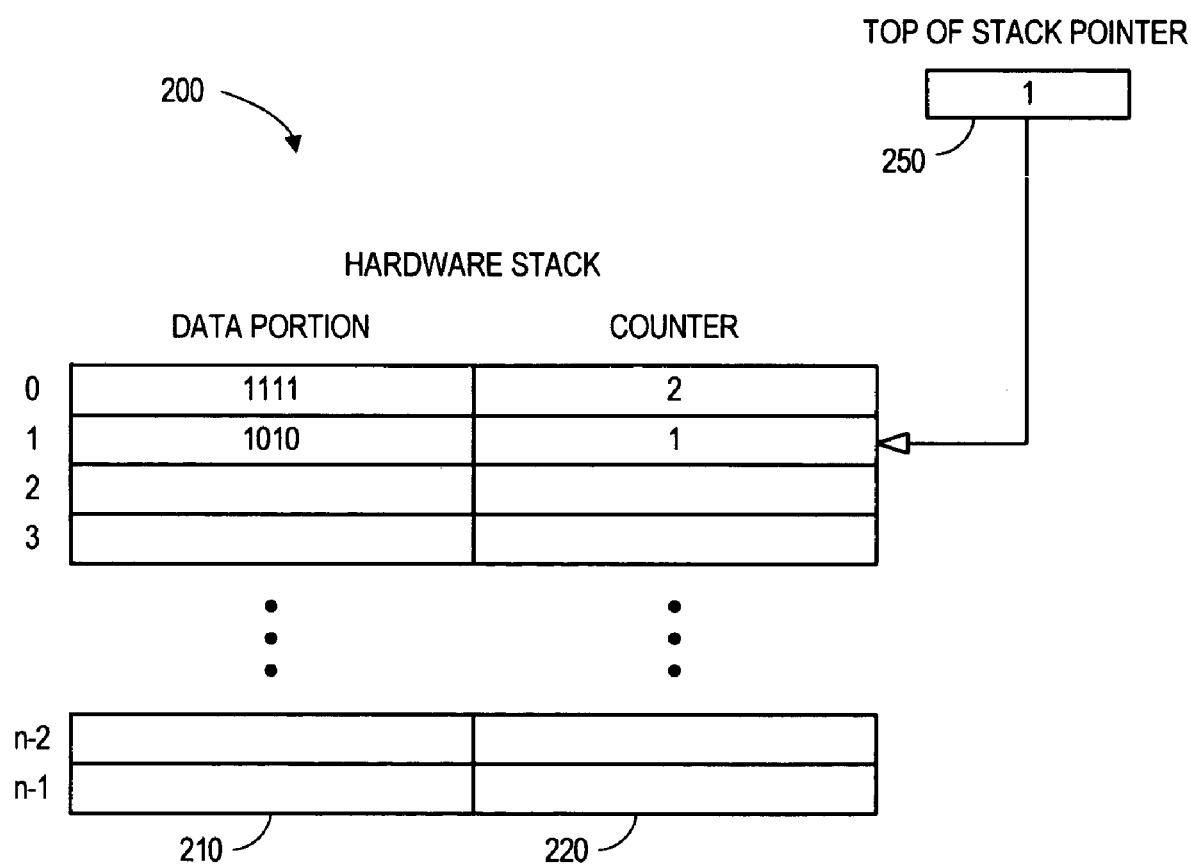

In FIG. 9, another pop is about to be performed. To do so, the value stored in the data portion 210 of the entry referenced by the TOS pointer 250 is output ("1010"). Moreover, the counter 220 associated with that entry is decremented from 2 to 1. Because that counter 220 is not 0, the TOS pointer 250 is not changed as illustrated in FIG. 10. In this case, the entry associated with the pop is not yet empty.

Such a stack 200 may be useful, for example, when it is expected that values being stored in the stack will frequently repeated. Consider, for example, an implementation needing a stack to store one thousand values, with 90% of the values being a repeat of the last stored value (any values after that one thousandth value, or "overflow," might be stored in another structure). A traditional approach might require one thousand hardware registers, while some embodiments described herein might be implemented using only two hundred (one hundred for data portions and one hundred for counters).

Figure 11:
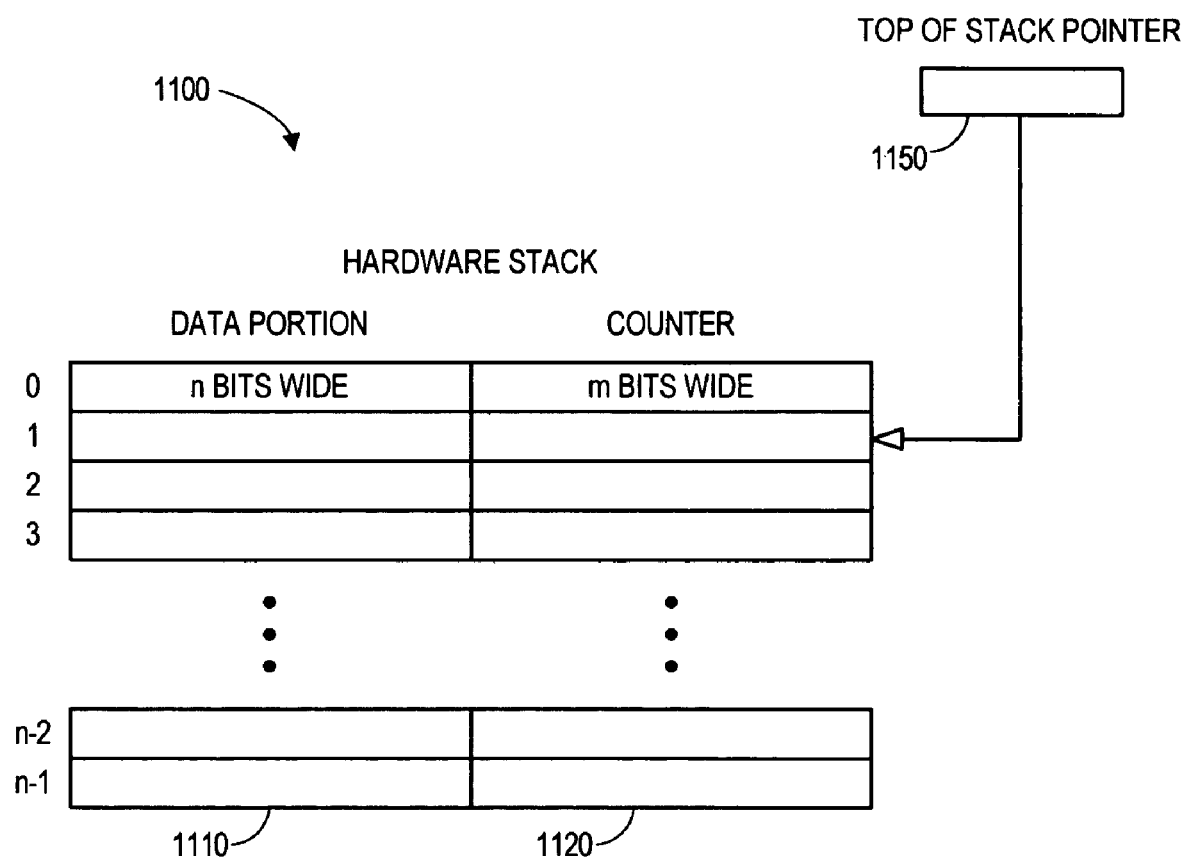
FIG. 11 is a block diagram of a hardware stack according to some embodiments.

Such a stack 200 might also be useful, for example, when the set of potential values that can be stored in the stack 200 is limited. Consider, for example, FIG. 11 which is a block diagram of a hardware stack 1100 according to some embodiments. In this case, the stack 1100 has n entries (n being an integer greater than 1). Each entry in the stack 1100 includes an n'-bit wide data portion 1110 (note that n' may be equal to n or may have a different value) and an associated m-bit wide counter 1120 representing how many times in a row the value of the data portion 1110 was pushed onto the stack. The stack 1100 also includes a TOS pointer 1150.

Moreover, assume that it is known that (i) the set of potential values that can be pushed onto the stack 1100 is limited to n, and (ii) a new value being pushed onto the stack 1100 cannot equal a prior value that was pushed onto the stack 1100 other than the last stored value. For example, if the set of values that could potentially be pushed onto the stack 1100 was {0000, 0001, 0010, 0100, 1000}, then after the following sequence:

0100, 1000, 1000, 1000, 0010 only 0000, 0001, or 0010 would be allowed to pushed onto the stack 1100 (e.g., because 0100 and 1000 are already stored in the stack). Note that 0010 is permitted because it equals the last value that was pushed onto the stack 1100. In such a situation, the TOS pointer 1150 will never reach a value greater than n-1. That is, the stack 1100 will not run out of entries in which a new value can be stored.

Note that each counter 1120 is limited to storing an m-bit value. For example, a 4-bit counter would only be able to record that an associated data portion 1110 was repeated eight times (seven if the action described with respect to element 312 of FIG. 3 is performed).

Figure 12:
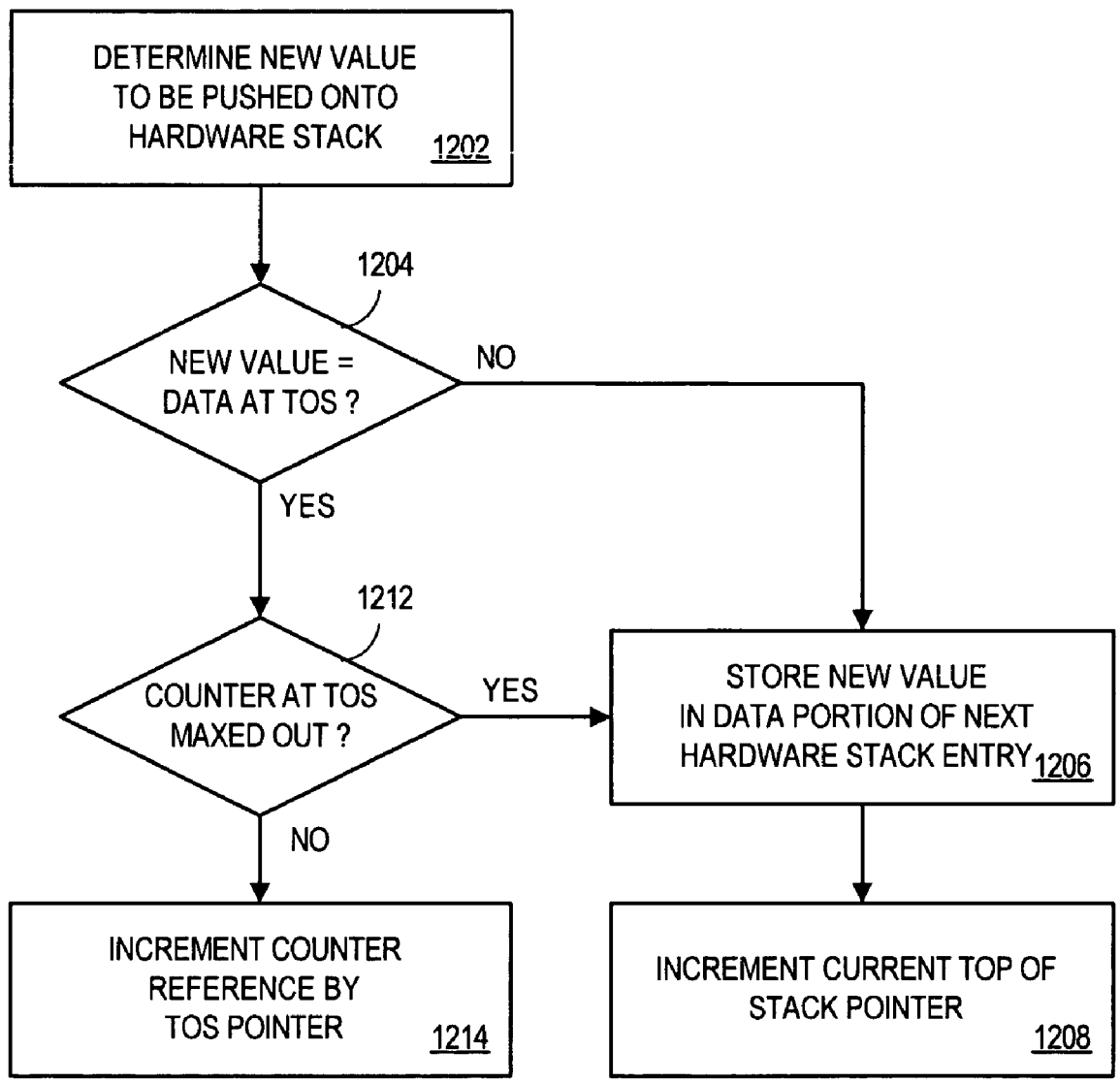
FIG. 12 is a flow chart of a method of pushing data onto a hardware stack according to some embodiments.

FIG. 12 is a flow chart of a method of pushing data onto such a hardware stack 1100 according to some embodiments. At 1202, a new value to be pushed onto the stack 1100 is determined. If the new value does not equal the value currently stored in the data portion 1110 of the entry referenced by the TOS pointer 1150, the new value is stored in the next entry of the stack at 1206. Moreover, the TOS pointer 1150 is incremented at 1208. Note that in this case, an action corresponding to element 312 of FIG. 3 is not being performed. As a result, the number stored in the counter 1120 will equal one less than the number of times the associated value was repeated.

If the new value does equal the value currently stored in the data portion 1110 of the entry referenced by the TOS pointer 1150, it is determined if the counter 1120 associated with that entry is at a maximum value at 1212 (e.g., "1111" in the case of a four-bit counter). If not, the counter 1120 is simply incremented at 1214. If the counter 1120 is at a maximum value, the actions described with respect to elements 1206 and 1208 are performed.

Figure 13:
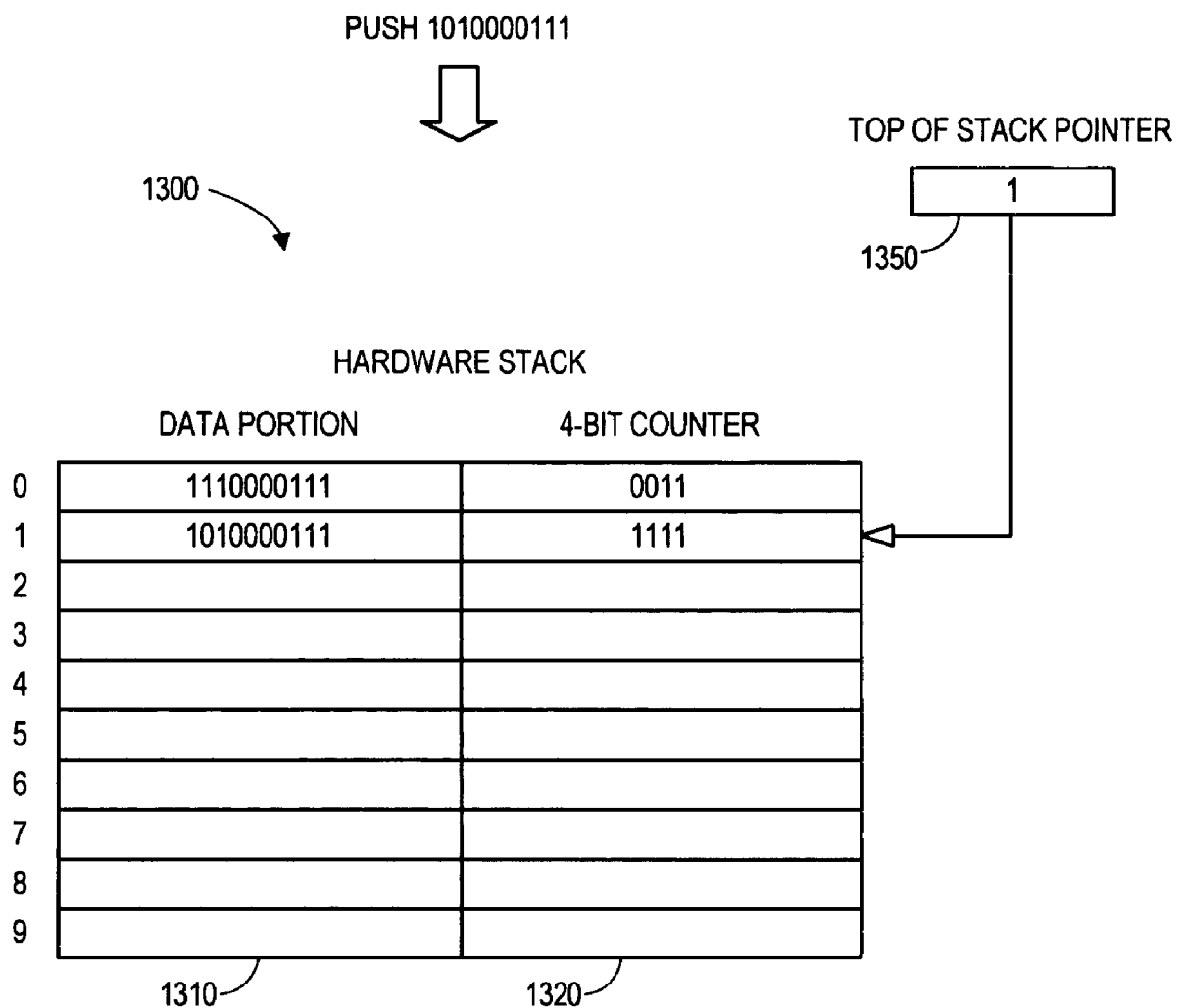
FIGS. 13 through 14 illustrate data being pushed onto a hardware stack according to some embodiments.

Consider, for example, FIG. 13 which is stack 1300 including ten entries, each entry including a ten-bit data portion 1310 and a four-bit counter 1320. The stack 1300 also includes a TOS pointer 1350. In this case, the value "1110001111" has been pushed onto the stack 1300 four times in a row followed by "1010000111" eight times in a row. Moreover, another "1010000111" is about to be pushed onto the stack 1300.

Figure 14:
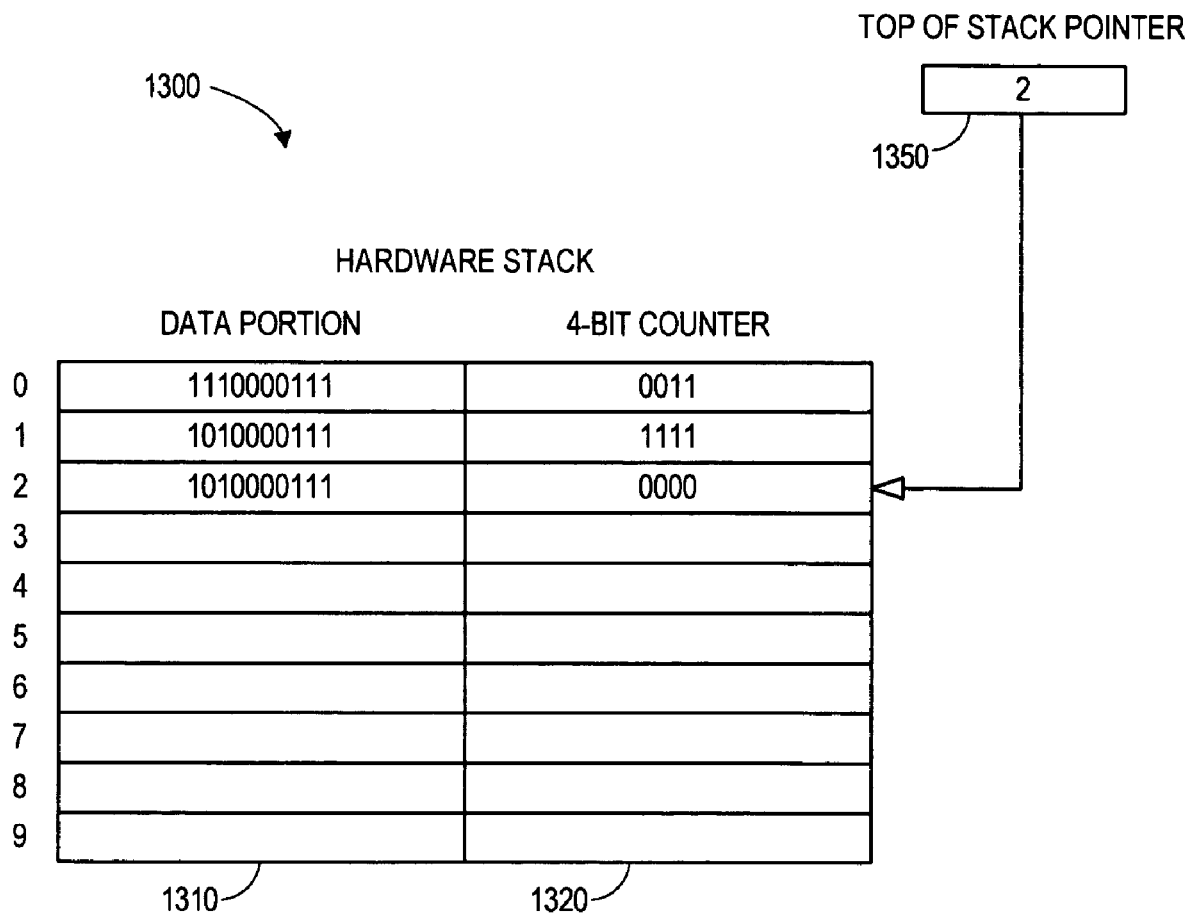

Because value of the counter 1320 at the TOS is at a maximum value, "1010000111" is repeated in the next entry and the TOS pointer 1350 is incremented as illustrated in FIG. 14. That is, the new value is treated as if it were different from the last value pushed onto the stack 1300. In this way, the stack 1300 may be able to handle repeated sequences beyond what would otherwise be supported by the size of the counter 1320. Note, however, that because two (or more) entries are being used by a single value, the stack 1300 can potentially run out of entries even if (i) the set of potential values that can be pushed onto the stack 1300 is limited to n, and (ii) a new value will never equal a prior value that was pushed onto the stack 1300 other than the last pushed value.

Some environments in which a hardware stack as described herein might be useful will now be described by way of examples. Note that embodiments might be used with respect to any other type of environment.

Some embodiments described herein are associated with a "processing system." As used herein, the phrase "processing system" may refer to any device that processes data. A processing system may, for example, be associated with a graphics engine that processes graphics data and/or other types of media information. Other examples of processing systems include a Central Processing Unit (CPU) and a Digital Signal Processor (DSP).

To improve the performance of a processing system, an instruction may be simultaneously executed for multiple operands of data in a single instruction period. Such an instruction may be referred to as a Single Instruction, Multiple Data (SIMD) instruction. For example, an eight-channel SIMD execution engine might simultaneously execute an instruction for eight 32-bit operands of data, each operand being mapped to a unique compute channel of the SIMD execution engine (e.g., to accelerate the transformation and/or rendering of three-dimensional geometric shapes).

Figure 15:
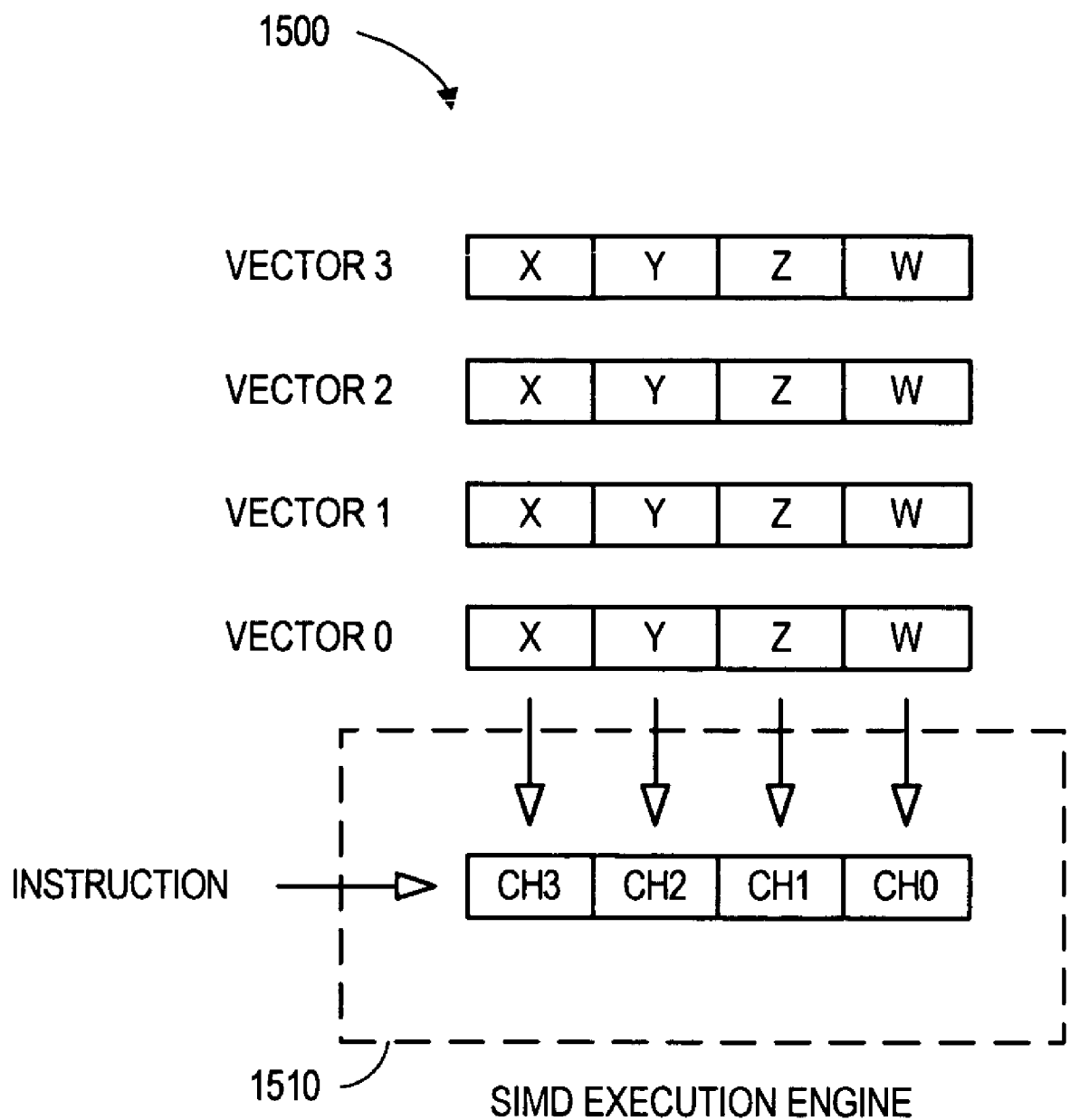
FIGS. 15 and 16 illustrate processing systems.

FIG. 15 illustrates one type of processing system 1500 that includes a SIMD execution engine 1510. In this case, the execution engine 1510 receives an instruction (e.g., from an instruction memory unit) along with a four-component data vector (e.g., vector components X, Y, Z, and W, each having bits, laid out for processing on corresponding channels 0 through 3 of the SIMD execution engine 1510). The engine 1510 may then simultaneously execute the instruction for all of the components in the vector. Such an approach is called a "horizontal," "channel-parallel," or "array of structures" implementation. Although some embodiments described herein are associated with a four-channel SIMD execution engine 1510, note that an SIMD execution engine could have any number of channels more than one (e.g., embodiments might be associated with a thirty-two channel execution engine).

Figure 16:
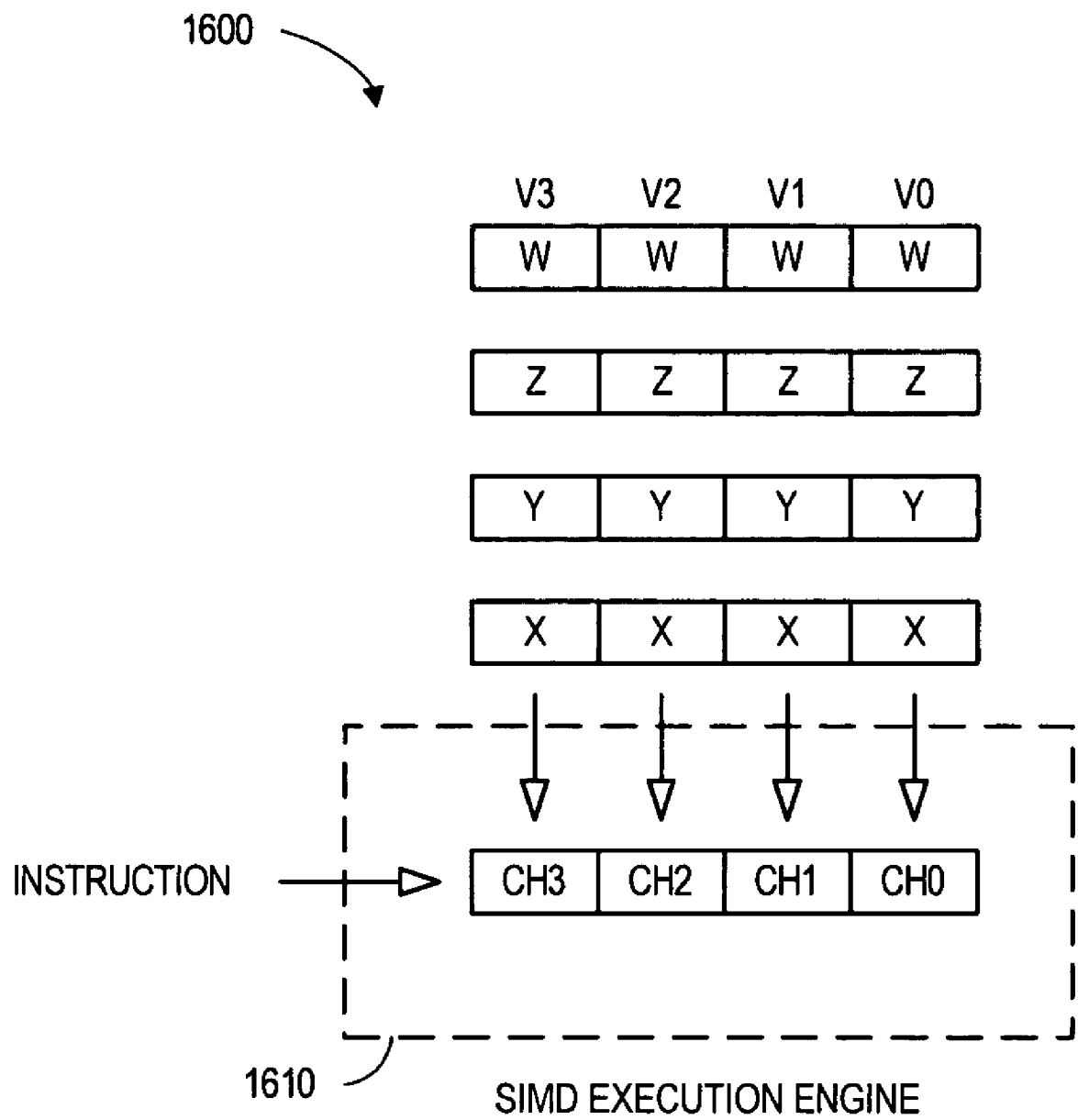

FIG. 16 illustrates another type of processing system 1600 that includes a SIMD execution engine 1610. In this case, the execution engine 1610 receives an instruction along with four operands of data, where each operand is associated with a different vector (e.g., the four X components from vectors 0 through 3). The engine 1610 may then simultaneously execute the instruction for all of the operands in a single instruction period. Such an approach is called a "vertical," "channel-serial," or "structure of arrays" implementation.

According to some embodiments, an SIMD instruction may be a "loop" instruction that indicates that a set of associated instructions should be executed, for example, a particular number of times or until a particular condition is satisfied. Consider, for example, the following instructions:

```
DO {
    sequence of instructions
} WHILE <condition>
```

Here, the sequence of instruction will be executed as long as the "condition is true." When such an instruction is executed in a SIMD fashion, however, different channels may produce different results of the <condition> test. For example, the condition might be defined such that the sequence of instructions should be executed as long as Var1 is not zero (and the sequence of instructions might manipulate Var1 as appropriate). In this case, Var1 might be zero for one channel and non-zero for another channel.

Figure 17:
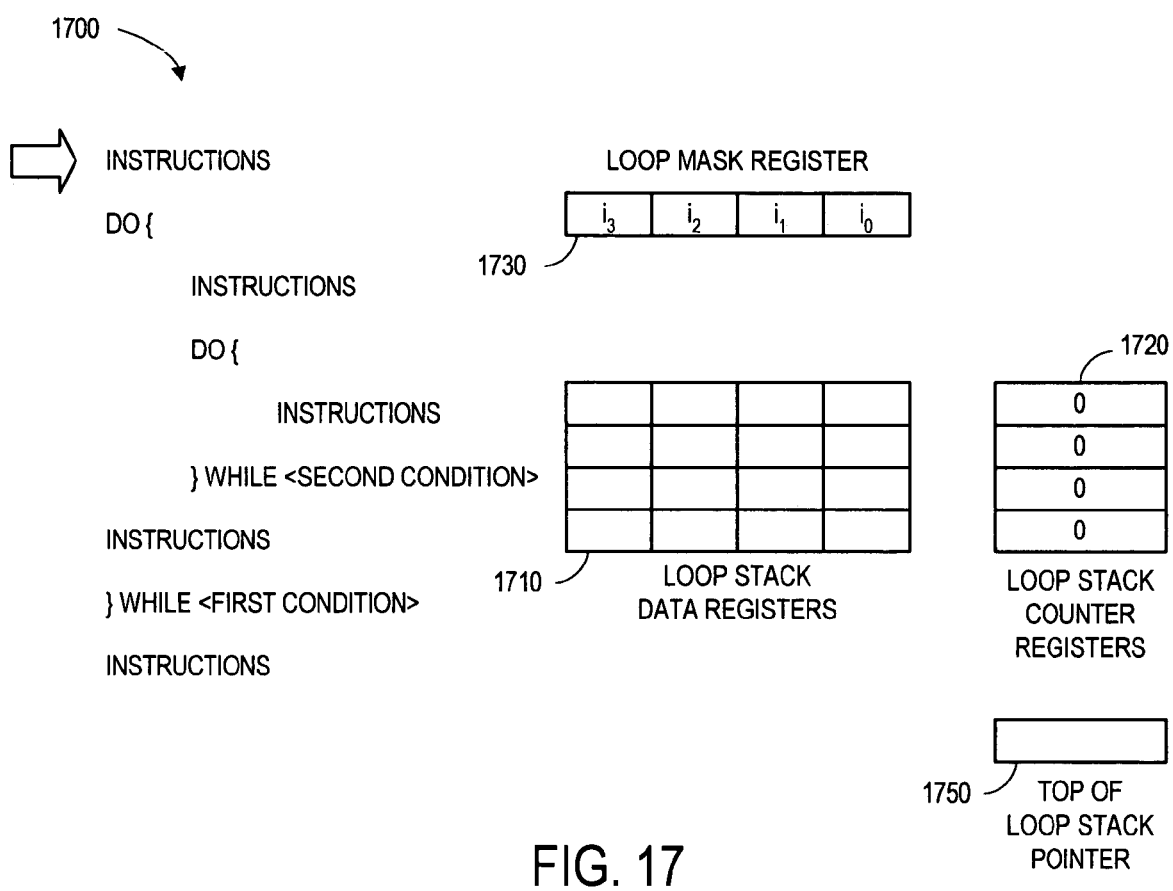

FIG. 17 illustrates a four-channel SIMD execution engine 1700 according to some embodiments. The engine 1700 includes a four-bit loop mask register 1730 in which each bit is associated with a corresponding compute channel. The loop mask register 1730 might comprise, for example, a hardware register in the engine 1700. The engine 1700 may also include a four-bit wide loop stack 1710. The loop stack 1710 is four entries deep and each entry includes an associated loop stack counter 1720 in accordance with any of the embodiments described herein. The loop stack 1710 also includes a loop stack counter registers 1740 and a top of loop stack pointer 1750.

The loop stack 1710 might comprise, for example, series of hardware registers, memory locations, and/or a combination of hardware registers and memory locations. Although the engine 1700, the loop mask register 1730, and the loop stack 1710 illustrated in FIG. 17 are four channels wide, note that implementations may be other numbers of channels wide (e.g., x channels wide), and each compute channel may be capable of processing a y-bit operand. According to some embodiments, there is a 1:1 correspondence between the compute channel, mask channel, and loop stack channel.

The engine 1700 may receive and simultaneously execute instructions for four different channels of data (e.g., associated with four compute channels). Note that in some cases, fewer than four channels may be needed (e.g., when there are less than four valid operands). As a result, the loop mask register 1730 may be initialized with an initialization vector indicating which channels have valid operands and which do not (e.g., operands $i_0$ through $i_{17}$, with a "1" indicating that the associated channel is currently enabled). The loop mask vector 1730 may then be used to avoid unnecessary processing (e.g., an instruction might be executed only for those operands in the loop mask register 1730 that are set to "1"). According to another embodiment, the loop mask register 1730 is simply initialized to all ones (e.g., it is assumed that all channels are always enabled). In some cases, information in the loop mask register 1730 might be combined with information in other registers (e.g., via a Boolean AND operation) and the result may be stored in an overall execution mask register (which may then used to avoid unnecessary or inappropriate processing).

Figure 18:
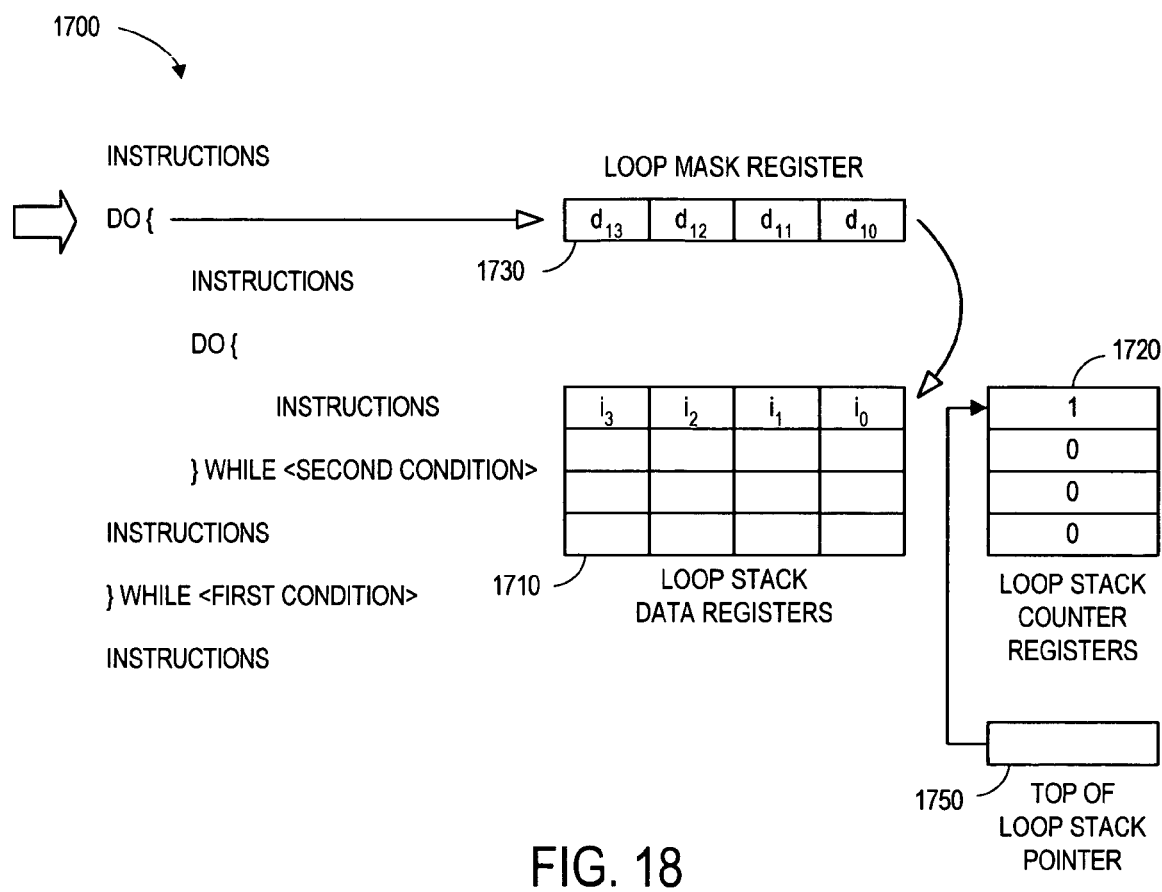
Figure 19:
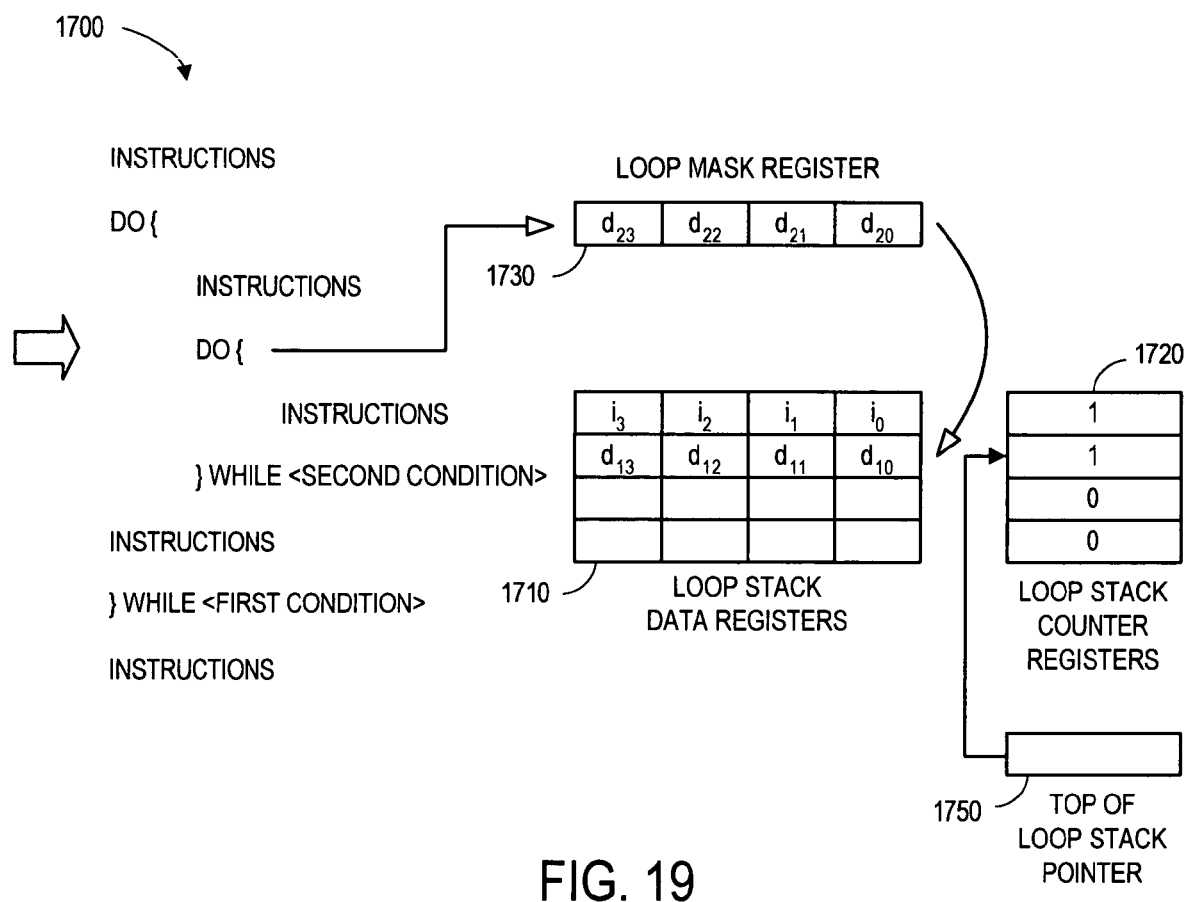
Figure 20:
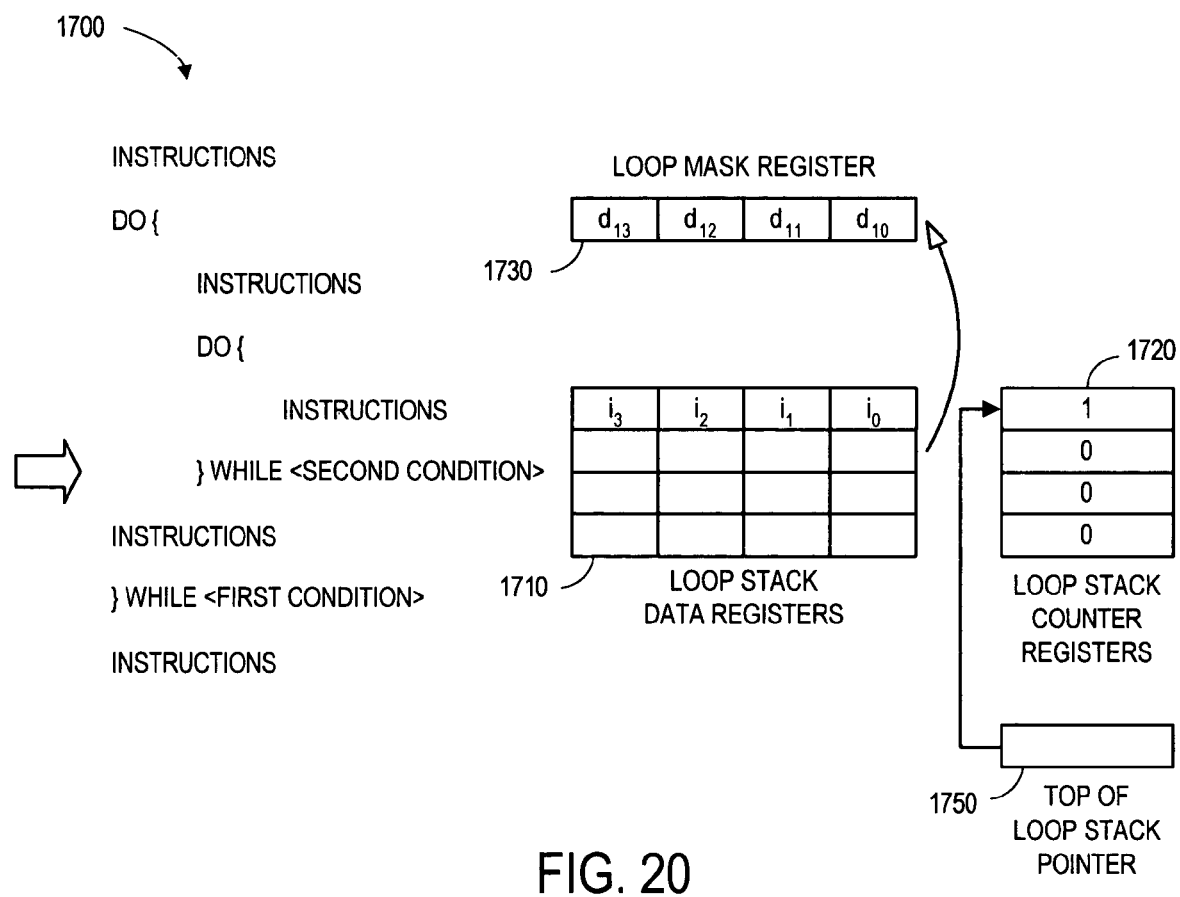
FIGS. 20 through 24 illustrate a SIMD execution engine executing nested conditional instructions according to some embodiments.

FIGS. 18 through 20 illustrate the engine 1700 executing nested DO instructions according to some embodiments. When the engine 1700 receives a loop instruction (e.g., a DO instruction), as illustrated in FIG. 18, the data in the loop mask register 1730 is copied to the top of the loop stack 1710, the value of the loop stack counter 1720 associated with that entry is incremented, and the TOS pointer 1750 is updated. Moreover, loop information is stored into the loop mask register 1730. The loop information might initially indicate, for example, which of the four channels were active when the DO instruction was first encountered (e.g., operands $d_0$ through $d_3$, with a "1" indicating that the associated channel is active).

The set of instructions associated with the DO loop are then executed for each channel in accordance with the loop mask register 1730. For example, if the loop mask register 1730 was "1110," the instructions in the loop would be executed for the data associated with the three most significant operands but not the least significant operand (e.g., because that channel is not currently enabled).

When a WHILE statement associated with the DO instruction is encountered, a condition is evaluated for the active channels and the results are stored back into the loop mask register 1730 (e.g., by a Boolean AND operation). For example, if the loop mask register 1730 was "1110" before the WHILE statement was encountered the condition might be evaluated for the data associated with the three most significant operands. The result is then stored in the loop mask register 1730. If at least one of the bits in the loop mask register 1730 is still "1," the set of loop instructions are executed again for all channels that have a loop mask register value of "1." By way of example, if the condition associated with the WHILE statement resulted in a "110x" result (where x was not evaluated because that channel was not enabled), "1100" may be stored in the loop mask register 1730. When the instructions associated with the loop are then re-executed, the engine 1700 will do so only for the data associated with the two most significant operands. In this case, unnecessary and/or inappropriate processing for the loop may be avoided. Note that no Boolean AND operation might be needed if the update is limited to only active channels.

A SIMD engine might be able to handle nested loop instructions (e.g., when a second loop block is "nested" inside of a first loop block). Consider, for example, the following set of instructions:

```
DO {
    first subset of instructions
    DO {
        second subset of instructions
    } WHILE <second condition>
    third subset of instructions
} WHILE <first condition>
```

In this case, the first and third subsets of instructions should be executed for the appropriate channels while the first condition is true, and the second subset of instructions should only be executed while both the first and second conditions are true.

FIG. 19 illustrates the execution of another, nested loop instruction (e.g., a second DO statement) according to some embodiments. In this case, the information currently in the loop mask register 1730 ($d_{10}$ through $d_{13}$) is pushed onto the "top" of the stack 1710. As a result, the information that was previously at the top of the stack 1710 (e.g., initialization vector $i_0$ through $i_3$) has now been pushed down by one entry. The engine 1700 also stores second loop information into the loop mask register 1730 ($d_{20}$ through $d_{23}$).

Note that as information is being pushed onto the stack 1710, the loop stack counters 1720 and TOS pointer 1750 may be updated according to any of the embodiments described herein. In the example illustrated in FIG. 19, the values of $d_{10}$ through $d_{13}$ were not equal to $i_0$ through $i_3$, so the second entry was used (and the TOS pointer 1750 reflects that the second entry is the top of the stack). Moreover, also note that as nested loops are encountered, bits in subsequent values being pushed onto the stack 1710 might stay the same or change from "1" to "0"—but cannot change from "0" to "1." Therefore (i) the set of potential values that can be pushed onto the stack 1710 is limited to 4, and (ii) a new value will not equal a prior value that was pushed onto the stack 1710 other than the last pushed value. As a result, the TOS pointer 1750 will never need to point to a fifth entry. That is, the stack 1710 will not run out of entries in which a new value can be stored (although one of the counters 1720 might overflow).

Also note that a significant number of repeated values may be generated as loops are encountered. As a result, embodiments may support the storage of a large number of values without using an impractical amount of hardware registers or RAM.

The loop block associated with the second loop instruction may then be executed as indicated by the information in the loop mask register 1730 (e.g., and, each time the second block is executed the loop mask register 1730 may be updated based on the condition associated with the second loop's WHILE instruction). When the second loop's WHILE instruction eventually results in every bit of the loop mask register 1730 being "0," as illustrated in FIG. 20, the data at the top of the loop stack 1710 (e.g., $d_{10}$ through $d_{13}$) may be removed back into the loop mask register 1730 and the counters 1720 a and TOS pointer 1750 may be updated as appropriate. Further instructions may then be executed in accordance with the loop mask register 1730. When the first loop block completes (not illustrated in FIG. 20), the initialization vector would be transferred back into the loop mask register 1730 and further instructions may be executed for data associated with enabled channels.

According to some embodiments, as SIMD engine can execute "conditional" instructions. Consider, for example, the following set of instructions:

```
IF <condition>
    first set of instructions
ELSE
    second set of instructions
END IF
```

Here, the first set of instructions will be executed when "condition" is true and the second set of instructions will be executed when "condition" is false. When such an instruction is simultaneously executed for multiple channels of data, however, different channels may produce different results. That is, the first set of instructions may need to be executed for some channels while the second set of instructions needs to be executed for other channels.

Figure 21:
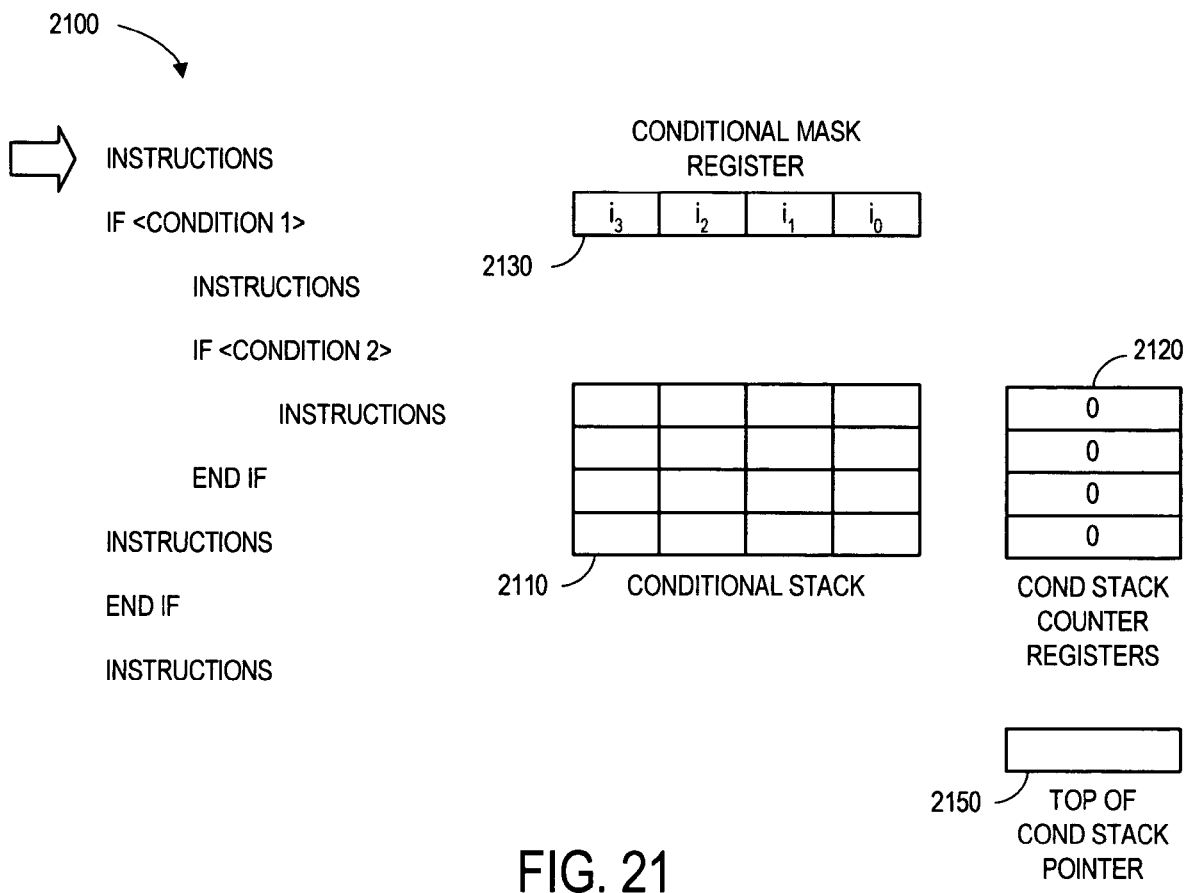

FIG. 21 illustrates a four-channel SIMD execution engine 2100 according to some embodiments. The engine 2100 includes a four-bit conditional mask register 2130 in which each bit is associated with a corresponding compute channel. The conditional mask register 2130 might comprise, for example, a hardware register in the engine 2100. The engine 2100 may also include a four-bit wide, four-entry deep conditional stack 2110, conditional stack counter registers 2120, and a TOS pointer 2150. The conditional stack 2110 might comprise, for example, series of hardware registers, memory locations, and/or a combination of hardware registers and memory locations (e.g., in the case of a ten entry deep stack, the first four entries in the stack 2110 might be hardware registers while the remaining six entries are stored in memory). Although the engine 2100, the conditional mask register 2130, and the conditional stack 2110 illustrated in FIG. 21 are associated with four channels, note that implementations may be associated with other numbers of channels (e.g., an x channel execution engine), and each compute channel may be capable of processing a y-bit operand.

As before, the conditional mask vector 2130 may be initialized with an initialization vector indicating which channels have valid operands and which do not (e.g., operands $i_0$ through $i_3$, with a "1" indicating that the associated channel is currently enabled). The conditional mask vector 2130 may then be used to avoid unnecessary processing (e.g., an instruction might be executed only for those operands in the conditional mask register 2130 that are set to "1").

Figure 22:
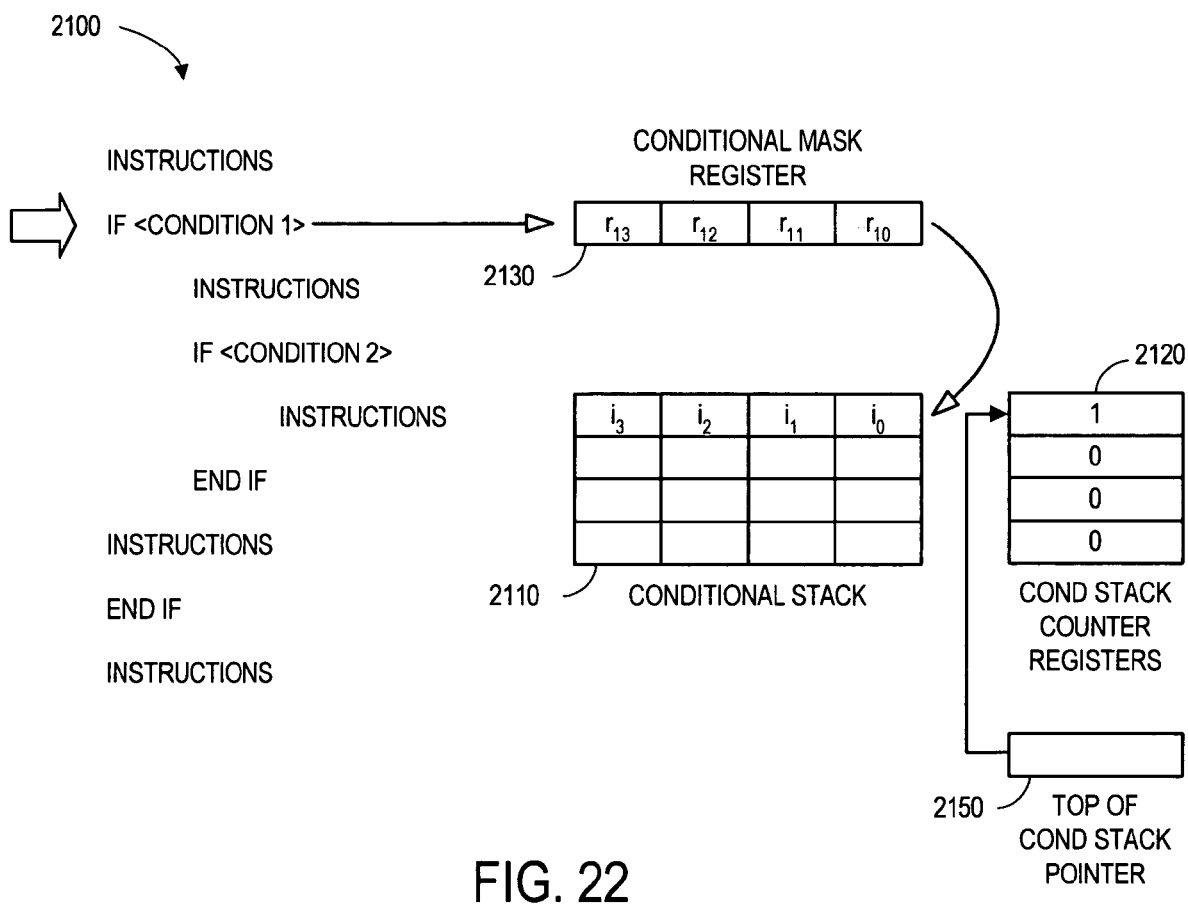

When the engine 2100 receives a conditional instruction (e.g., an "IF" statement), as illustrated in FIG. 22, the data in the conditional mask register 2130 is copied to the top of the conditional stack 2110. The conditional stack counters 2120 and top of conditional stack pointer 2150 may also be updated as described herein (e.g., the counter 2120 of the first entry may be set to one). Moreover, the instruction is executed for each of the four operands in accordance with the information in the conditional mask register. The result is then stored in the conditional mask register 2130 and can be used to avoid unnecessary and/or inappropriate processing for the statements associated with the IF statement. By way of example, if the condition associated with the IF statement resulted in a "110x" result (where x was not evaluated because the channel was not enabled), "1100" may be stored in the conditional mask register 2130. When other instructions associated with the IF statement are then executed, the engine 2100 will do so only for the data associated with the two MSBs (and not the data associated with the two LSBs).

According to some embodiments, one conditional instruction may be nested inside of a set of instructions associated with another conditional instruction. Consider, for example, the following set of instructions:

```
IF <first condition>
    first set of instructions
    IF <second condition>
        second set of instructions
    END IF
    third set of instructions
END IF
```

In this case, the first and third sets of instructions should be executed when "first condition" is true and the second set of instructions should only be executed when both "first condition" and "second condition" are true.

Figure 23:
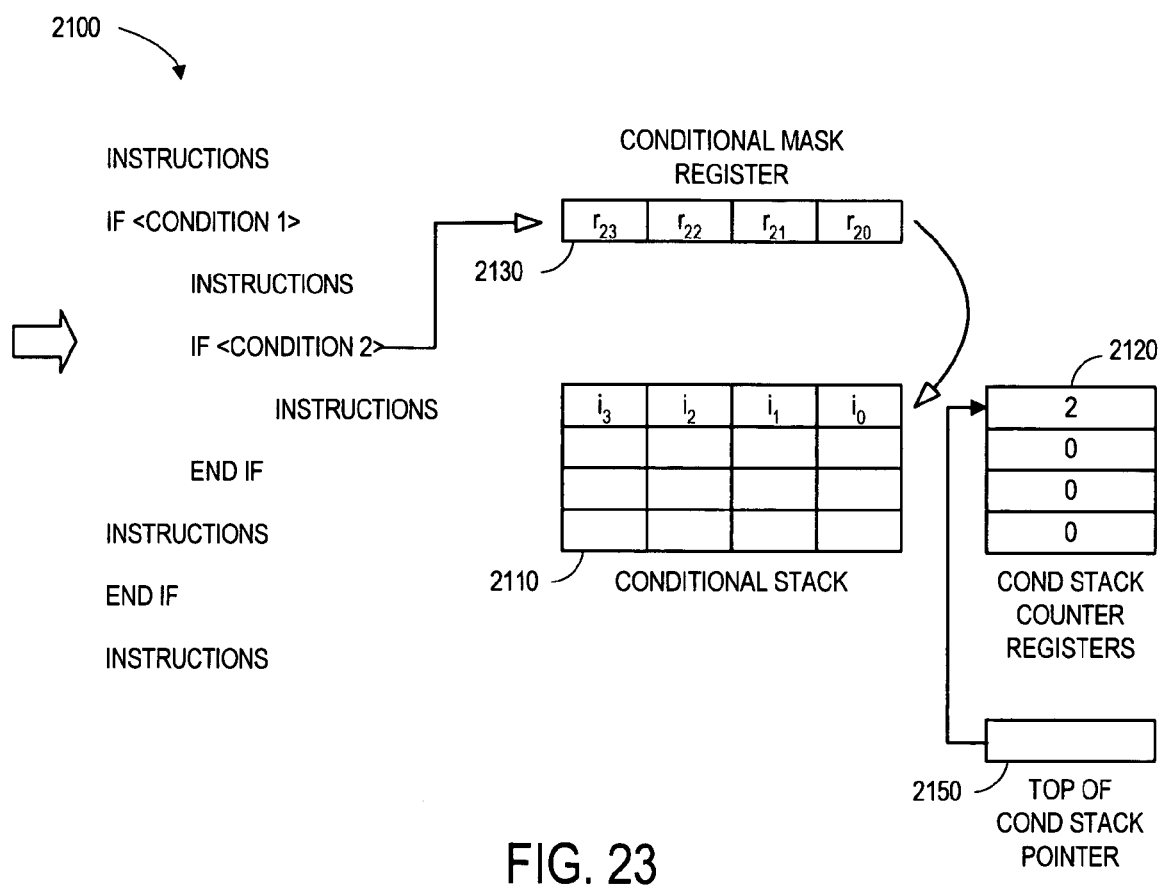

FIG. 23 illustrates the execution of another, nested conditional instruction (e.g., a second IF statement) according to some embodiments. In this case, the information currently in the conditional mask register 2130 is pushed onto the top of the stack 2110. As a result, the information that was previously at the top of the stack 2110 (e.g., the initialization vector) has been pushed "down" by one entry. Note, however, that in the example illustrated in FIG. 23 the values of $r_{12}$ through $r_{13}$ were exactly equal to $i_0$ through $i_3$, so the first stack entry was re-used and the associated counter 2120 was incremented from one to two (and the TOS pointer 1750 reflects that the first entry is still the top of the stack).

Multiple channels of data are then simultaneously evaluated in accordance with the (i) the information currently in the conditional mask register 2130 (e.g., $r_{10}$ through $r_{13}$) and the condition associated with the second conditional instruction (e.g., "condition 2"). The result of this evaluation is then stored into the conditional mask register (e.g., $r_{20}$ through $r_{23}$) and may be used by the engine 2100 to execute further instructions associated with the second conditional instruction for multiple operands of data as indicated by the information in the conditional mask register 2130.

As information is being pushed onto the stack 2110, the conditional stack counters 2120 and TOS pointer 2150 may be updated according to any of the embodiments described herein. Moreover, note that as nested conditional instructions are encountered, bits in subsequent values being pushed onto the stack 2110 might stay the same or change from "1" to "0"—but cannot change from "0" to "1." Therefore (i) the set of potential values that can be pushed onto the stack 2110 is limited to 4, and (ii) a new value will not equal a prior value that was pushed onto the stack 2110 other than the last pushed value. As a result, the TOS pointer 2150 will never need to point to a fifth entry. That is, the stack 2110 will not run out of entries in which a new value can be stored (although a counter 2120 might overflow).

Figure 24:
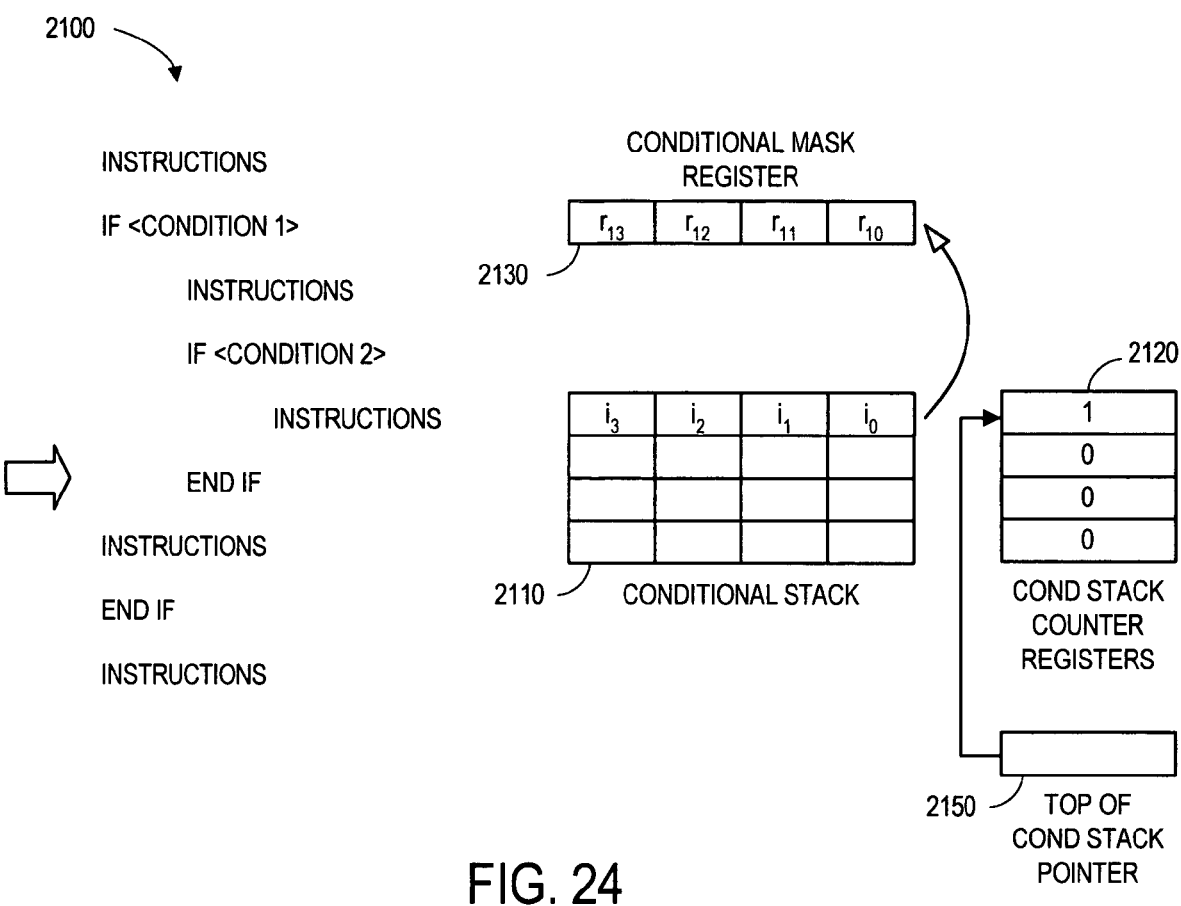

When the engine 2100 receives an indication that the end of instructions associated with the second conditional instruction has been reached (e.g., and "END IF" statement), as illustrated in FIG. 24, the data at the top of the conditional stack 2110 (e.g., $r_{10}$ through $r_{13}$) may be moved back into the conditional mask register 2130. Further instructions may then be executed in accordance with the conditional mask register 2110. If another END IF statement is encountered (not illustrated in FIG. 24), the initialization vector would be transferred back into the conditional mask register 2130 and further instructions may be executed for data associated with enabled channels.

Figure 25:
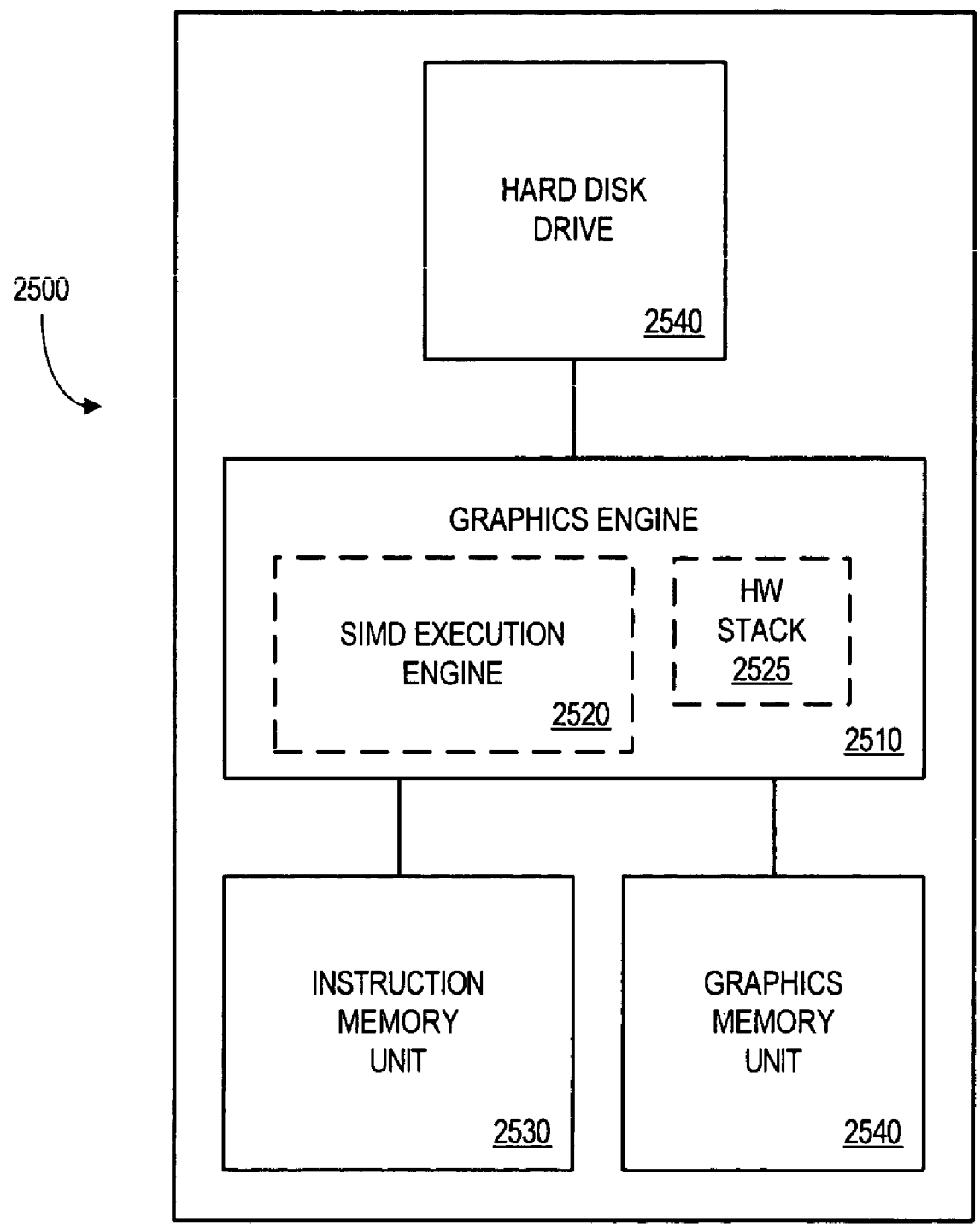
FIG. 25 is a block diagram of a system according to some embodiments.

FIG. 25 is a block diagram of a system 2500 according to some embodiments. The system 2500 might be associated with, for example, a media processor adapted to record and/or display digital television signals. The system 2500 includes a graphics engine 2510 that has an n-operand SIMD execution engine 2520 in accordance with any of the embodiments described herein. For example, the SIMD execution engine 2520 might have n data registers, n counter registers (each counter register being associated with one of the data registers), and a top of stack pointer register in accordance with any of the embodiments described herein. The system 2500 may also include an instruction memory unit 2530 to store SIMD instructions and a graphics memory unit 2540 to store graphics data (e.g., vectors associated with a three-dimensional image). The instruction memory unit 2530 and the graphics memory unit 2540 may comprise, for example, Random Access Memory (RAM) units.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Moreover, although different embodiments have been described, note that any combination of embodiments may be implemented (e.g., a SIMD engine might support both looping and conditional instructions). Moreover, although examples have used "0" to indicate a channel that is not enabled according to other embodiments a "1" might instead indicate that a channel is not currently enabled. Similarly, it will be understood that counters and/or pointers may be incremented or decremented depending on a particular implementation.

According to some embodiments, multiple values may be pushed onto a stack. Consider, for example, the following algorithm:

```
void push(int data, int count) {
    if ( data == TOS->data_bit_field) {
        if ( count + TOS->count <= MAX_COUNT) {
            TOS->count += count;
        } else {
```

```
            count = MAX_COUNT - TOS->count;
            TOS->count = MAX_COUNT;
            TOS++;
            TOS->data = data
            TOS->count = count;
        }
    } else {
        TOS++;
        TOS->data = data;
        TOS->count = count;
    }
}
```

In this case, the data value being pushed is compared to that held in the data portion of the entry pointed to by the TOS pointer. If the TOS data and the pushed data are bit-wise identical, the count value in the entry identified as TOS is increased by the number of data copies being pushed. If the two data values bit-wise differ, a new TOS stack entry is first selected by incrementing the TOS pointer. Then the pushed data is stored in the new TOS entry and the associated counter set to the number of data copies being pushed.

Similarly, a number of values may be popped from a stack using one operation:

```
int pop(count) {
    int retValue = TOS->data_bit_field;
    int residual = count;
    while (residual > 0) {
        if (residual >= TOS->count) {
            residual -= TOS->count;
            TOS->count = 0;
            TOS--;
        } else {
            TOS->count -= residual;
        }
    }
    return retValue;
}
```

In this case, the caller specifies the number of pops it would like to perform in one operation. The data value of the entry pointed by the TOS pointer is returned to the caller. The associated count field of the TOS entry is decremented by the number of pops specified by the caller. In some cases the pop count may exceed that held in the current TOS count field. In this case, the count is applied across sequential stack entries until consumed.

The several embodiments described herein are solely for the purpose of illustration. Persons skilled in the art will recognize from this description other embodiments may be practiced with modifications and alterations limited only by the claims.

What is claimed is:

1. A method, comprising:
   determining a new value to be pushed onto a hardware stack having a first entry associated with a current top of stack pointer, the first entry including a data portion and an associated counter;
   if the new value equals the data portion of the first entry, incrementing the associated counter of the first entry to equate to a number of times the new value has been repeated, wherein the current top of stack pointer is not incremented;
   if the new value does not equal the data portion associated with the first entry, storing the new value in the data portion of a next entry and incrementing the current top of stack pointer, wherein the new value is selected from a set of n potential values, and wherein the data portion is n bits wide; and
   determining that the new value to be to be pushed onto the hardware stack equals a prior value already pushed onto the hardware stack, wherein the new value cannot be pushed onto the hardware stack if the new value equals a prior value pushed onto the hardware stack other than the value stored in the data portion associated with the current top of stack pointer.

2. The method of claim 1, wherein the associated counter is incremented by 1 if the new value equals the data portion associated with the first entry.

3. The method of claim 1, wherein the current top of stack pointer is incremented by 1 if the new value does not equal the first entry.

4. The method of claim 1, wherein bits in a value pushed onto the hardware stack can (i) change from 0 to 1 but not from 1 to 0 as compared to the last value pushed onto the hardware stack, or (ii) change from 1 to 0 but not from 0 to 1 as compared to the last value pushed onto the hardware stack.

5. The method of claim 1, further comprising:
   determining a second value to be pushed onto the hardware stack;
   determining that second value equals the data portion of the first entry;
   determining that the associated counter of the first entry equals a maximum value; and
   storing the second value in the data portion of the next entry, incrementing or initializing the associated counter of the next entry, and incrementing the current top of stack pointer.

6. The method of claim 1, further comprising:
   determining that a value is to be popped from the hardware stack;
   retrieving the value stored in the data portion associated with the current top of stack pointer; and
   decrementing the associated counter of an entry associated with the current top of stack pointer.

7. The method of claim 6, further comprising:
   determining that the associated counter of an entry associated with the current top of stack pointer equals a minimum value; and
   decrementing the current top of stack pointer.

8. The method of claim 1, wherein the hardware stack is associated with a loop stack of an n-channel single instruction, multiple-data execution engine.

9. The method of claim 8, wherein the new value is associated with an evaluation of a loop instruction based on multiple operands of data.

10. The method of claim 1, wherein the hardware stack is associated with a conditional stack of an n-channel single instruction, multiple-data execution engine.

11. The method of claim 10, wherein the new value is associated with an evaluation of a conditional instruction based on multiple operands of data.

* * * * *